US012096891B2

(12) United States Patent
Stafford et al.

(10) Patent No.: US 12,096,891 B2
(45) **Date of Patent: *Sep. 24, 2024**

(54) BATHTUB DOOR SYSTEMS AND METHODS

(71) Applicant: Safeway Safety Step, LLC, West Chester, OH (US)

(72) Inventors: Christopher Brian Stafford, Liberty Township, OH (US); Michael Anthony Serraino, Cincinnati, OH (US); Bruce R. Slattery, West Chester, OH (US)

(73) Assignee: Safeway Safety Step, LLC, West Chester, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/223,213

(22) Filed: Jul. 18, 2023

(65) Prior Publication Data

US 2023/0355042 A1 Nov. 9, 2023

Related U.S. Application Data

(63) Continuation of application No. 17/947,140, filed on Sep. 18, 2022, now abandoned, which is a (Continued)

(51) Int. Cl.
*A47K 3/16* (2006.01)
*A47K 3/00* (2006.01)
(Continued)

(52) U.S. Cl.
CPC ................ *A47K 3/16* (2013.01); *A47K 3/001* (2013.01); *A47K 3/003* (2013.01); *A47K 3/006* (2013.01);
(Continued)

(58) Field of Classification Search
CPC .......... A47K 3/16; A47K 3/001; A47K 3/003; A47K 3/006; A47K 3/02; A47K 17/02; E06B 5/00; E06B 7/16; Y10T 29/49826
(Continued)

(56) References Cited

U.S. PATENT DOCUMENTS 2,052,628 A 9/1936 Higgins
2,063,864 A 12/1936 Zinkil
(Continued)

FOREIGN PATENT DOCUMENTS

CA 1049997 A 3/1979
CA 2018849 A * 2/1991 ............. A47K 3/006
(Continued)

OTHER PUBLICATIONS

GreyB Services, Validity Search Report, dated Aug. 25, 2008, 41 pages.

(Continued)

*Primary Examiner* — Lori L Baker
(74) *Attorney, Agent, or Firm* — Frost Brown Todd LLP; Vance V. VanDrake, III; Alexander J. Johnson

(57) ABSTRACT

Embodiments described herein include a bathtub that can include a U-shaped step saddle associated with a door assembly. The door assembly can include a hinge coupled with the U-shaped step saddle such that the door assembly can be transitioned between an open position and a closed position. The door assembly can include a catch and a latch to secure the door in the closed position.

20 Claims, 25 Drawing Sheets

Related U.S. Application Data continuation of application No. 16/731,300, filed on Dec. 31, 2019, now Pat. No. 11,445,863, which is a continuation of application No. 15/805,413, filed on Nov. 7, 2017, now abandoned, which is a continuation of application No. 15/266,849, filed on Sep. 15, 2016, now abandoned, which is a continuation of application No. 15/153,328, filed on May 12, 2016, now abandoned, which is a continuation of application No. 13/466,623, filed on May 8, 2012, now Pat. No. 9,375,115, which is a continuation-in-part of application No. 12/975,288, filed on Dec. 21, 2010, now abandoned, which is a continuation-in-part of application No. 12/792,817, filed on Jun. 3, 2010, now abandoned, which is a continuation of application No. 12/713,437, filed on Feb. 26, 2010, now abandoned.

(60) Provisional application No. 61/155,640, filed on Feb. 26, 2009.

(51) Int. Cl.
*A47K 3/02* (2006.01)
*A47K 17/02* (2006.01)
*E06B 5/00* (2006.01)
*E06B 7/16* (2006.01)

(52) U.S. Cl.
CPC ................ *A47K 3/02* (2013.01); *A47K 17/02* (2013.01); *E06B 5/00* (2013.01); *E06B 7/16* (2013.01); *Y10T 29/49826* (2015.01)

(58) Field of Classification Search
USPC .......... 4/555, 556, 559, 560.1, 517.1, 573.1, 4/574.1, 538, 540
See application file for complete search history.

(56) References Cited

U.S. PATENT DOCUMENTS

| | | | | | |
|---|---|---|---|---|---|
| 2,075,933 | A | * | 4/1937 | Friedlander ............ | A47K 3/006 4/556 |
| 2,122,626 | A | | 7/1938 | Smith | |
| 2,511,756 | A | | 6/1950 | Wallace | |
| 2,520,129 | A | | 8/1950 | Dall et al. | |
| 2,569,825 | A | | 10/1951 | Otis | |
| 2,818,578 | A | | 1/1958 | Cantrell | |
| 2,896,991 | A | | 7/1959 | Martin, Jr. | |
| 2,942,907 | A | | 6/1960 | Nagel et al. | |
| 2,984,510 | A | | 5/1961 | Hoffmann | |
| 2,991,482 | A | | 7/1961 | Brass | |
| 3,066,316 | A | | 12/1962 | Russell | |
| 3,184,807 | A | | 5/1965 | Schornstheimer et al. | |
| 3,276,804 | A | | 10/1966 | Heppner | |
| 3,380,078 | A | | 4/1968 | Hanson | |
| 3,416,166 | A | | 12/1968 | Hanson | |
| 3,439,506 | A | | 4/1969 | Martin | |
| 3,461,466 | A | * | 8/1969 | Stahlhut ................... | A47K 3/34 4/557 |
| 3,492,037 | A | | 1/1970 | Hutchinson | |
| 3,600,025 | A | | 8/1971 | Brainard | |
| 3,633,862 | A | | 1/1972 | Breen | |
| 3,663,971 | A | | 5/1972 | Bonhote | |
| 3,719,960 | A | | 3/1973 | Russell | |
| 3,955,221 | A | * | 5/1976 | Finch ..................... | A47K 3/006 4/539 |
| 3,971,080 | A | | 7/1976 | Walker | |
| 4,067,071 | A | | 1/1978 | Altman et al. | |
| 4,092,037 | A | | 5/1978 | Greenwald | |
| 4,158,585 | A | | 6/1979 | Wright | |
| 4,290,154 | A | | 9/1981 | Benjamin | |
| 4,346,485 | A | | 8/1982 | Reed et al. | |
| 4,360,935 | A | * | 11/1982 | Barrett, Sr. ............ | A47K 3/006 4/555 |
| 4,364,132 | A | * | 12/1982 | Robinson ............. | A01K 63/003 4/584 |
| 4,542,545 | A | * | 9/1985 | Johnson ................. | A47K 3/006 4/557 |
| 4,546,506 | A | | 10/1985 | Houle et al. | |
| 4,553,299 | A | * | 11/1985 | Ebert ..................... | A61H 33/02 29/469 |
| 4,561,160 | A | * | 12/1985 | Nicol ..................... | A47K 3/006 29/401.1 |
| 4,796,312 | A | | 1/1989 | Corlew | |
| 4,802,247 | A | | 2/1989 | Leichle et al. | |
| 4,871,204 | A | | 10/1989 | Cook et al. | |
| 4,878,530 | A | * | 11/1989 | Jean ........................ | E06B 3/481 160/211 |
| 4,890,341 | A | * | 1/1990 | Forbes ................... | A47K 3/006 4/584 |
| 4,953,241 | A | | 9/1990 | Williams | |
| 4,993,087 | A | * | 2/1991 | Roquebrune .......... | A47K 3/006 4/604 |
| 5,050,252 | A | | 9/1991 | Cuttriss | |
| 5,184,358 | A | * | 2/1993 | Gruidel .................. | A47K 3/006 277/647 |
| 5,241,713 | A | | 9/1993 | Wang | |
| 5,275,518 | A | | 1/1994 | Guenther | |
| 5,341,524 | A | * | 8/1994 | Zellner .................. | A47K 3/006 4/604 |
| 5,351,345 | A | * | 10/1994 | Sills ....................... | A47K 3/006 4/557 |
| 5,446,929 | A | | 9/1995 | Sills et al. | |
| 5,463,780 | A | * | 11/1995 | Harris .................... | A47K 3/006 4/604 |
| 5,473,799 | A | | 12/1995 | Aoki | |
| 5,549,149 | A | | 8/1996 | Sills et al. | |
| 5,560,092 | A | | 10/1996 | Roiger | |
| 5,606,751 | A | | 3/1997 | Baker | |
| 5,628,851 | A | * | 5/1997 | Lawler .................... | B29C 33/38 4/555 |
| 5,690,157 | A | * | 11/1997 | Chen ...................... | A47K 3/362 4/558 |
| 5,701,614 | A | | 12/1997 | Appleford et al. | |
| 6,061,846 | A | * | 5/2000 | Peterson ................ | A47K 3/001 4/555 |
| 6,085,367 | A | | 7/2000 | Guiste | |
| 6,112,344 | A | | 9/2000 | Guenther | |
| 6,212,704 | B1 | * | 4/2001 | Peterson ................ | A47K 3/001 4/584 |
| 6,226,810 | B1 | | 5/2001 | Weddendorf et al. | |
| 6,253,393 | B1 | * | 7/2001 | Dries .................... | E05D 15/264 16/370 |
| 6,256,806 | B1 | | 7/2001 | DiTommaso | |
| 6,272,698 | B1 | * | 8/2001 | Stafford ................. | A47K 3/001 4/584 |
| 6,334,225 | B1 | | 1/2002 | Brinkmann | |
| 6,381,769 | B1 | | 5/2002 | Lofquist | |
| 6,430,759 | B1 | | 8/2002 | Beltran | |
| 6,615,420 | B1 | | 9/2003 | Hyden et al. | |
| 6,735,792 | B2 | | 5/2004 | Johansson | |
| 6,766,543 | B1 | | 7/2004 | Hollis et al. | |
| 6,893,199 | B2 | | 5/2005 | Michels | |
| 7,100,405 | B2 | | 9/2006 | West | |
| D539,398 | S | | 3/2007 | Stafford | |
| 7,299,509 | B1 | * | 11/2007 | Neidich ................. | A47K 3/006 4/556 |
| 7,597,652 | B2 | | 10/2009 | Walker et al. | |
| D605,818 | S | | 12/2009 | Farley | |
| D610,657 | S | | 2/2010 | Torres | |
| 7,778,937 | B2 | | 8/2010 | Ferrara et al. | |
| 7,926,126 | B2 | | 4/2011 | Whitley | |
| 8,230,568 | B2 | | 7/2012 | Stafford | |
| 8,341,774 | B1 | * | 1/2013 | Norris ...................... | A47K 3/34 4/557 |
| 8,375,478 | B2 | | 2/2013 | Luo | |
| 8,505,128 | B2 | | 8/2013 | Staudinger | |
| 8,732,871 | B2 | | 5/2014 | Neidich et al. | |
| 8,898,824 | B2 | | 12/2014 | Neidich et al. | |

(56) References Cited

U.S. PATENT DOCUMENTS

| | | | | |
|---|---|---|---|---|
| 9,131,809 | B2 | 9/2015 | Stafford et al. | |
| 9,375,115 | B2 | 6/2016 | Stafford et al. | |
| 9,578,993 | B2 | 2/2017 | Stafford et al. | |
| D790,047 | S | 6/2017 | Stafford et al. | |
| D797,266 | S | 9/2017 | Stafford et al. | |
| 10,750,910 | B2 | 8/2020 | McKee et al. | |
| 11,445,863 | B2 | 9/2022 | Stafford et al. | |
| 2004/0034917 | A1 | 2/2004 | Noro et al. | |
| 2004/0064883 | A1 | 4/2004 | Appleford et al. | |
| 2004/0237184 | A1* | 12/2004 | Longman | A47K 3/006 4/555 |
| 2005/0044620 | A1 | 3/2005 | Metcalf | |
| 2005/0102746 | A1 | 5/2005 | Wright et al. | |
| 2005/0199025 | A1 | 9/2005 | West | |
| 2005/0210938 | A1 | 9/2005 | Doyle et al. | |
| 2006/0080772 | A1 | 4/2006 | Saiz et al. | |
| 2006/0230526 | A1 | 10/2006 | Skinner | |
| 2008/0000158 | A1 | 1/2008 | Ranelli et al. | |
| 2008/0083063 | A1 | 4/2008 | Libit et al. | |
| 2008/0087283 | A1 | 4/2008 | Cromack et al. | |
| 2008/0092361 | A1 | 4/2008 | Neidich | |
| 2008/0109954 | A1* | 5/2008 | Neidich | A47K 3/006 4/556 |
| 2008/0111383 | A1 | 5/2008 | Van Ravenhorst | |
| 2008/0222787 | A1* | 9/2008 | Staudinger | A47K 3/006 4/538 |
| 2009/0010420 | A1 | 1/2009 | Khanna | |
| 2010/0037382 | A1 | 2/2010 | Spiker et al. | |
| 2010/0156120 | A1 | 6/2010 | Luo | |
| 2010/0212083 | A1 | 8/2010 | Stafford | |
| 2010/0236041 | A1 | 9/2010 | Stafford | |
| 2010/0263119 | A1* | 10/2010 | Neidich | A47K 3/006 49/400 |
| 2010/0325789 | A1* | 12/2010 | Ouyoung | A47K 3/006 4/555 |
| 2011/0099787 | A1 | 5/2011 | Stafford | |
| 2011/0307547 | A1 | 12/2011 | Backer et al. | |
| 2012/0005820 | A1 | 1/2012 | Stafford | |
| 2012/0102013 | A1 | 4/2012 | Martini | |
| 2012/0123667 | A1 | 5/2012 | Gueziec | |
| 2012/0192350 | A1 | 8/2012 | Stafford et al. | |
| 2012/0216343 | A1 | 8/2012 | Stafford et al. | |
| 2012/0284122 | A1 | 11/2012 | Brandis | |
| 2012/0303402 | A1 | 11/2012 | Koury | |
| 2012/0304376 | A1* | 12/2012 | Neidich | B29C 43/003 4/555 |
| 2013/0051546 | A1 | 2/2013 | Fried et al. | |
| 2013/0051549 | A1 | 2/2013 | Klemm | |
| 2013/0090957 | A1 | 4/2013 | Popkey et al. | |
| 2013/0127634 | A1 | 5/2013 | Grumbles, III | |
| 2013/0304534 | A1 | 11/2013 | Mehta et al. | |
| 2014/0040282 | A1 | 2/2014 | Mann et al. | |
| 2015/0305573 | A1 | 10/2015 | Stafford et al. | |
| 2015/0335206 | A1 | 11/2015 | Stafford et al. | |
| 2016/0000272 | A1 | 1/2016 | Jin | |
| 2016/0256014 | A1 | 9/2016 | Stafford et al. | |
| 2017/0000297 | A1 | 1/2017 | Stafford et al. | |
| 2018/0310776 | A1 | 11/2018 | Stafford et al. | |
| 2023/0014493 | A1 | 1/2023 | Stafford et al. | |

FOREIGN PATENT DOCUMENTS

| | | | | |
|---|---|---|---|---|
| DE | 20214218 | U1 | 1/2003 | |
| EP | 0162103 | A1 | 11/1985 | |
| EP | 0457093 | B1 | 2/1994 | |
| EP | 585564 | A2 * | 3/1994 | A47K 3/006 |
| EP | 0700655 | A1 | 3/1996 | |
| EP | 0913115 | A1 | 5/1999 | |
| EP | 0933052 | A2 | 8/1999 | |
| EP | 1428467 | A1 | 6/2004 | |
| EP | 1447038 | A2 | 8/2004 | |
| EP | 1747747 | A2 | 1/2007 | |
| GB | 853067 | A | 11/1960 | |
| GB | 880368 | A | 10/1961 | |
| GB | 2038981 | A | 7/1980 | |
| GB | 2381746 | A | 5/2003 | |
| JP | H10-137313 | A | 5/1998 | |
| JP | 2002-336325 | A | 11/2002 | |
| WO | WO-9623438 | A1 * | 8/1996 | A47K 3/36 |
| WO | WO-03056992 | A1 * | 7/2003 | A47K 3/006 |
| WO | WO 2006-110085 | A1 | 10/2006 | |
| WO | WO-2008110010 | A1 * | 9/2008 | A47K 3/006 |

OTHER PUBLICATIONS

Safety Bath Inc., Door Insert Kit Installation Manual, Ituna SK, Canada, dated Mar. 2008, 17 pages.

Safety Bath Inc., Door Insert Kit, Measurement and Installation, 5 pages.

* cited by examiner

BATHTUB DOOR SYSTEMS AND METHODS

CROSS-REFERENCE TO RELATED APPLICATIONS

This application is a continuation of Ser. No. 17/947,140, filed on Sep. 18, 2022, which is a continuation of Ser. No. 16/731,300, filed on Dec. 31, 2019, which is a continuation of Ser. No. 15/266,849, filed on Sep. 15, 2016, which is a continuation of application Ser. No. 15/153,328, filed on May 12, 2016, which is a continuation of application Ser. No. 13/466,623, filed May 8, 2012, now U.S. Pat. No. 9,375,115, which is a continuation-in-part application of application Ser. No. 12/975,288, filed Dec. 21, 2010, which is a continuation-in-part application of application Ser. No. 12/792,817, filed Jun. 3, 2010, which is a continuation application of application Ser. No. 12/713,437, filed Feb. 26, 2010, which claims priority to U.S. Provisional Patent Application Ser. No. 61/155,640, filed Feb. 26, 2009, the disclosures of which are all hereby expressly incorporated by reference herein in their entirety.

FIELD

Embodiments shown herein relate, in general, to a bathtub overlay, and, in particular, to a bathtub overlay having an access opening.

BACKGROUND

Traditional bathtubs may have high sidewalls, referred to as tub aprons, which allow a bathtub to hold a large volume of water. Many individuals, particularly the elderly and those suffering from arthritis, debilitating injury, handicap, and/or general loss of mobility, may have trouble accessing a bathtub area due to the high step that is typically required to step into and out of a bathtub. For such persons, the sidewall of a bathtub may be an insurmountable hurdle. Even with the assistance of a health aide, many individuals may not be capable of safely stepping over the sidewall of a bathtub and into the bathtub to take a bath or shower Consequently, these persons may forego taking a bath or shower altogether and settle for alternate bathing methods, such as sponge baths and the like. Many people, however, may not find such alternative bathing methods satisfactory.

SUMMARY

In accordance with one embodiment, a method is disclosed including providing a first opening in a sidewall of a bathtub, the sidewall including a top wall, an inner wall, and an outer wall, where the first opening extends along a length of the sidewall and has a depth extending generally downward from the top wall of the sidewall. The method further includes providing an overlay including an assistance feature, the overlay including a body configured to receive at least a portion of the bathtub, wherein the body defines a channel and a second opening and positioning the overlay such that the overlay substantially covers the top wall of the sidewall and the sidewall is positioned within the channel defined by the body of the overlay, where the first opening is aligned with the second opening.

In an alternate version, a method is disclosed including providing a tub liner having a body, a channel defined by the body, and a first opening defined by the body, where the channel of the tub liner is configured for placement over the sidewall of a bathtub having a second opening formed therein, and positioning the body of the tub liner over the sidewall of the bathtub such that the first opening of the tub liner is aligned with the second opening of the sidewall of the bathtub.

In accordance with one embodiment, a bathtub overlay is disclosed having an assistance feature and a body, the body being configured for placement over an existing bathtub, the body including a sidewall, the sidewall defining a channel and an opening, and a bottom wall integral with the sidewall, the bottom wall and the sidewall cooperating to define a cavity, where the cavity is in communication with the opening to facilitate the ingress and egress of a bather into the cavity. The bathtub overlay further includes an assistance feature in communication with the body.

BRIEF DESCRIPTION OF THE DRAWINGS

The accompanying drawings incorporated in and forming a part of the specification illustrate several aspects of the embodiments contemplated, and together with the description serve to explain the principles of the embodiments; it being understood, however, that the described embodiments are not limited to the precise arrangements shown. In the drawings, like reference numerals refer to like elements in the several views. In the drawings.

DETAILED DESCRIPTION

Versions of a bathtub insert or overlay described herein include a product and process that may improve access to a bathtub. In one version, an insert or overlay may be placed in or over a cutout section of an exposed wall of a bathtub. This insert, when properly positioned in the cutout section of the tub wall, may effectively lower the tub wall to permit easy access to the interior of the tub for those who are physically challenged by the height of the wall of a typical bathtub. In an alternate version, an existing bathtub may be retrofitted by cutting and removing a section of the existing sidewall and adding a generally U-shaped structure featuring an operational, watertight, and sealable door. Such a door may allow for easy access to the interior of the bathtub while providing the ability to continue to utilize the bathtub for a shower or full bath. The surface of the U-shaped structure, step-saddle, or framed insert may feature a skid-resistant tread plate on its top surface to help prevent a user from slipping and/or falling.

Figure 1:
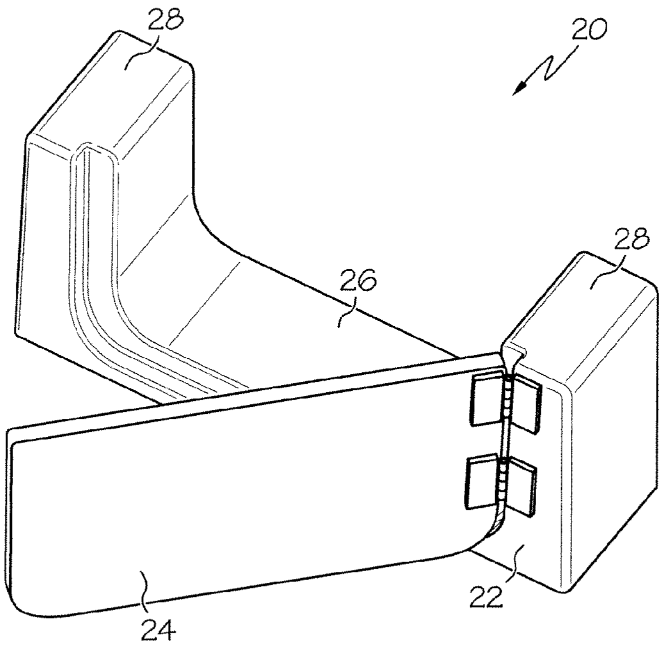
FIG. 1 is an isometric view of a bathtub insert according to one embodiment.

Referring to FIG. 1, one version of a bathtub insert 20 is shown. Bathtub insert 20 may include a U-shaped box frame with a hinged door attached to the frame. For example, FIG. 1 shows bathtub insert 20 as comprising a step-saddle 22, or frame, and a door 24. Step-saddle 22 may further include a step-plate 26 and an end-plate 28. FIG. 1 shows, for example, step-saddle 22 as comprising a pair of end-plates 28. Step-plate 26 may be stepped over or upon by a user to gain access to the interior or exterior of a bathtub. End-plates 28 may originate at the ends of step-plate 26 and extend upwards from and perpendicular to the step-plate 26 and generally parallel to each other. End-plates 28 may define the ends of bathtub insert 20 and cover the sides of the U-shaped opening cut in the sidewall of the bathtub.

In one version, bathtub insert 20 may be retrofitted to an existing bathtub, where the dimensions of the bathtub insert 20 are configured to cover all of the cut lines from the removal of a portion of the bathtub. The bathtub insert 20 may be sized such that the removed portion of the bathtub need not have precise dimensions with tight tolerances. Bathtub insert 20 may effectively seal the cutout portion of the tub even if the cutout does not, for example, have the exact dimensions suggested for the installation. Bathtub insert 20 may be configured from any suitable material as will be apparent to one of ordinary skill in the art. For example, bathtub insert 20 may be made of a polymer, such as a polyethylene. The bathtub insert 20 may be fabricated using a rotational molding process or any other suitable method of fabrication.

Figure 2:
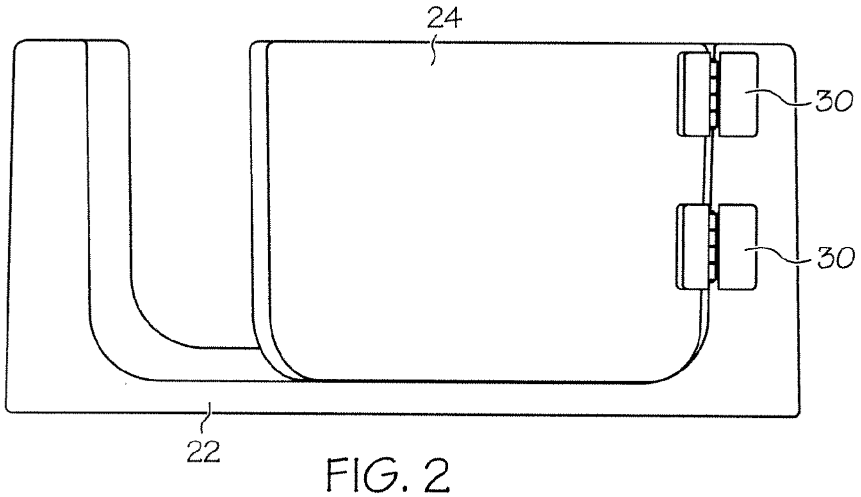
FIG. 2 is a rear view of the bathtub insert shown in FIG. 1.

Referring to FIG. 2, bathtub insert 20 may also include a door 24. In one version, the door 24 is watertight and is configured to allow easy access to the inside of a tub while allowing the tub to fully function as a bath when the door 24 is in the closed position. The door 24 may be configured from any suitable material as will be apparent to one of ordinary skill in the art such as a polymer, polyethylene, metal, stainless steel, ceramic, composite material, and/or glass. Door 24 may include a solid sheet of material or a plurality of sheets of material.

Figure 39:
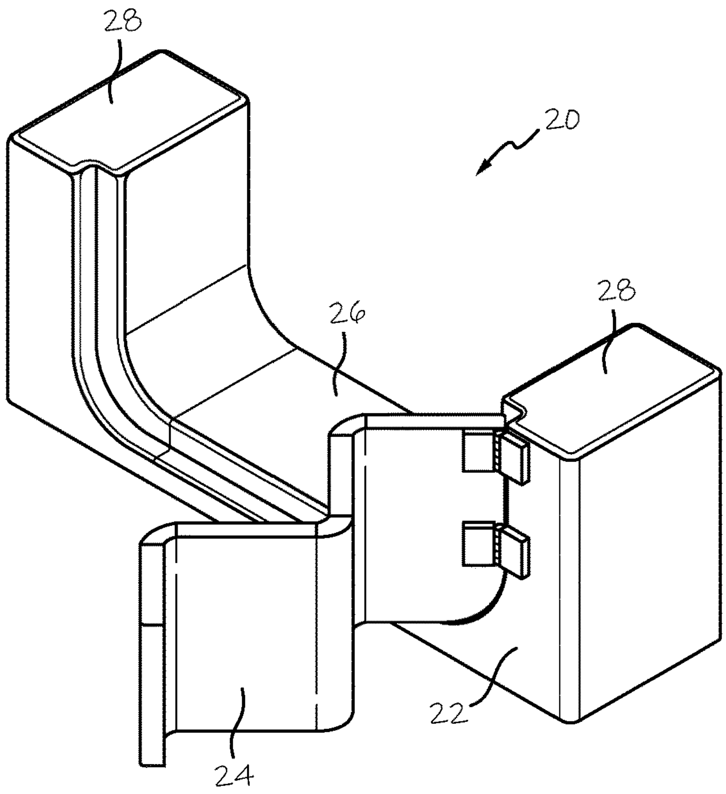
FIG. 39 is an isometric view of a bathtub insert according to one embodiment.
Figure 40:
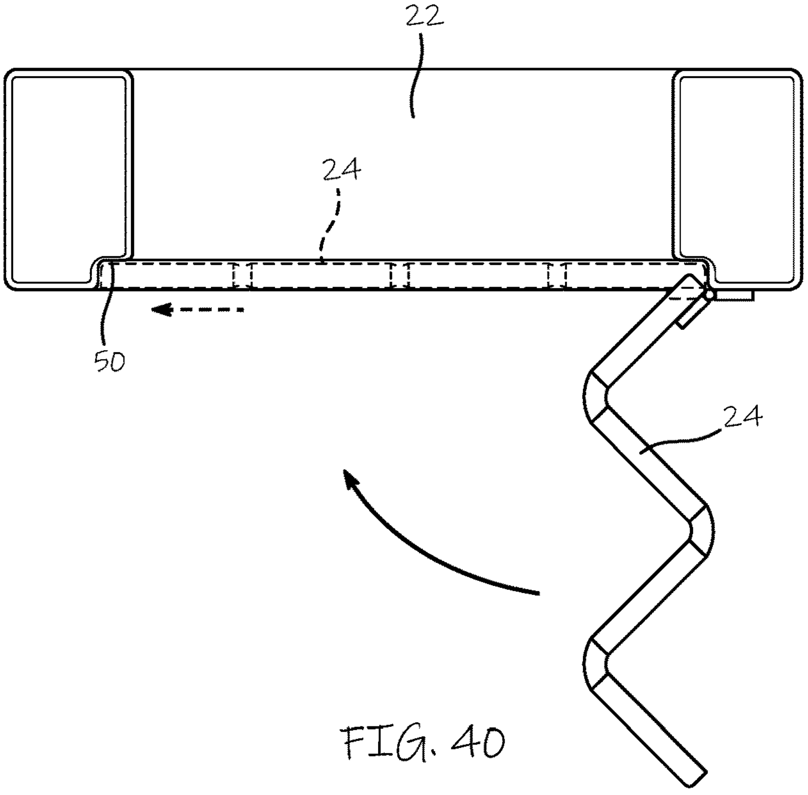
FIG. 40 is a top view of the bathtub insert shown in FIG. 39.
Figure 41:
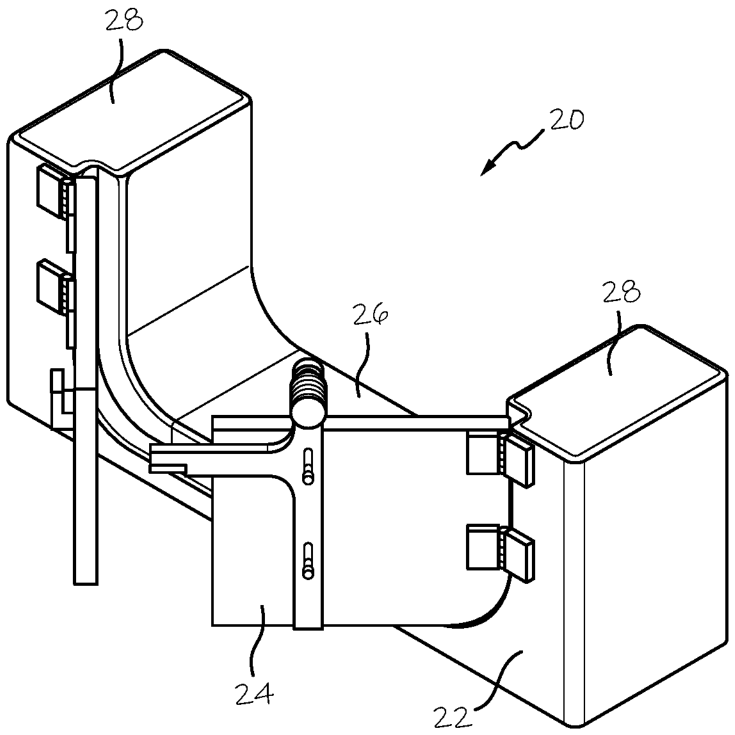
FIG. 41 is an isometric view of a bathtub insert according to one embodiment.
Figure 42:
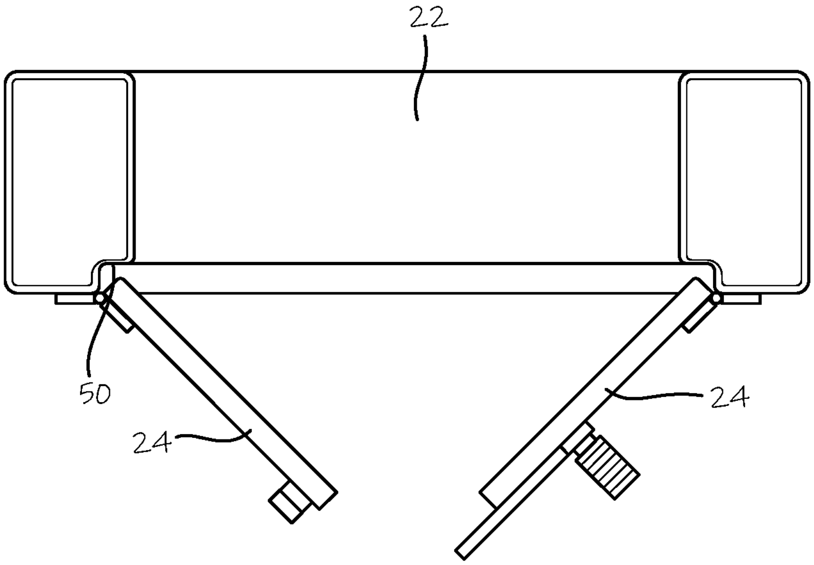
FIG. 42 is a top view of the bathtub insert shown in FIG. 41.

Versions of the door 24 may have any suitable construction or structure as will be apparent to one of ordinary skill in the art. For example, door 24 may include a single panel or a plurality of panels. Multi-panel versions of the door 24 may include an accordion configuration of a plurality of integral panels such as shown in FIGS. 39 and 40, two generally equally sized doors that meet towards the center of the bathtub insert 20 and swing inwardly such as shown in FIGS. 41 and 42, telescoping panels, and the like. For example, bathtub insert 20 may include two doors (FIGS. 41 and 42)) that latch together in the middle. In another example, bathtub insert 20 may include two doors that function in a similar fashion to saloon doors, wherein one door may be closed and secured within a channel formed in step-saddle 22 and the second door may be closed and secured within another channel formed in step-saddle 22 with a latch, seal, or magnet.

The door 24 may include an accessory such as, for example, a latch, magnet, snap, or other mechanism for locking or securing the door, multiple panels of a door, selected panels of the door, or the like. It will be appreciated that any suitable configuration of latch, connector, or adhesive is contemplated. An accessory, such as a latch, magnet, snap, etc., may be fabricated along with door 24 such that the door and accessory may be considered an all-in-one system or integral. Alternatively, an accessory may be attached to door 24 after the door is fabricated. For example, a latch may be attached to door 24 after the door is fabricated.

In an alternate version, the door 24 may be secured within a groove around the internal perimeter of the bathtub insert, where a removable component is lowered into the groove or channel to seal the tub.

In an alternate version, a door, blocking member, or capsule may be lowered into the opening of the bathtub insert 20 and/or over the bathtub insert 20 to effectively seal off the opening in the bathtub insert 20. The door, blocking member, or covering may be a solid material that, after a bather has entered the tub, is placed over the top of the bathtub insert 20 to provide a complete seal of the tub. For example, door 24 may lay horizontally within the generally U-shaped opening in step-saddle 22. In this version, the door or blocking member may completely fill the void in step-saddle 22. This door or blocking member may be affixed to the inside of the insert opening in any suitable manner such as, for example, with a magnet, seal, or both. In another version, a capsule or covering may cover the entire bathtub insert 20. The capsule or covering may be hinged or be a retrofit component that is placed over the top of the bathtub insert 20 to fully or partially obstruct the space in the insert. Any suitable connector or seal may be located around all, or a portion of bathtub insert 20 to facilitate attachment of a door, blocking member, capsule, covering, or the like.

In one version (not shown), the door 24 is fastened with a hinge such that door 24, when in a closed position, fits horizontally over the generally U-shaped opening in step-saddle 22. In this version, door 24 may be opened by pulling up on the door. In another version, door 24 may be opened by removing the door from bathtub insert 20 completely. For example, bathtub insert 20 may not include a hinge 30, the interior and/or exterior of door 24 may include a plurality of magnets, and step-saddle 22 may include a plurality of corresponding magnets or strike plates or a recessed groove or channel. In this way, door 24 may be closed by pressing the magnetized door into place to seal the generally U-shaped opening in the step-saddle 22. Correspondingly, door 24 may be opened by pulling door 24 with sufficient force to overcome the magnets or to pull the seal out of the groove. In another example, one side of door 24 may be magnetic, while the other side is not.

Referring to FIG. 2, door 24 may be affixed to the U-shaped frame via a hinge 30 FIG. 2 shows, for example, a pair of hinges 30 that attach door 24 to step-saddle 22. Hinge 30 may be affixed to step-saddle 22 in any suitable manner as will be apparent to one of ordinary skill in the art. For example, hinge 30 may be fastened into step-saddle 22 with a screw or other fastener. In this way, door 24 may be in an open or closed position. FIG. 1 shows door 24 in an open position. Hinges 30 may be affixed to the door 24, to the step-saddle 22, to the top of the step-saddle, and/or may have any other suitable placement or configuration.

Figure 3:
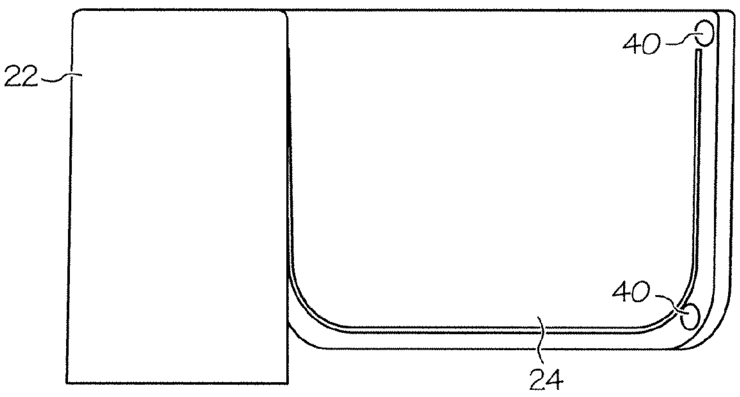
FIG. 3 is a side view of the bathtub insert shown in FIG. 1.

Referring to FIG. 3, the inner surface of door 24 may include a magnet 40. FIG. 3 shows, for example, a pair of magnets 40. Magnets 40 may bond to a strike plate (not pictured in FIG. 3) mounted on or within step-saddle 22. Magnets 40 may provide a watertight seal for door 24 against step-saddle 22. Alternatively, or in addition to a magnet, door 24 may be secured in any other suitable manner as will be apparent to one of ordinary skill in the art. For example, door 24 may be secured with a sealant, seal, adhesive, buffer, or the like.

Figure 4:
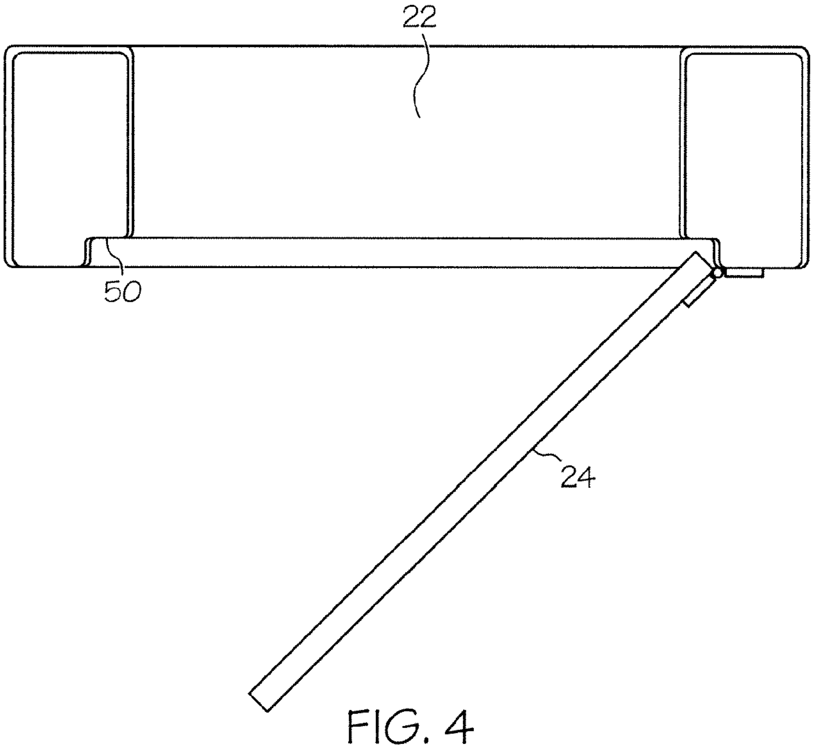
FIG. 4 is a top view of the bathtub insert shown in FIG. 1.
Figure 5:
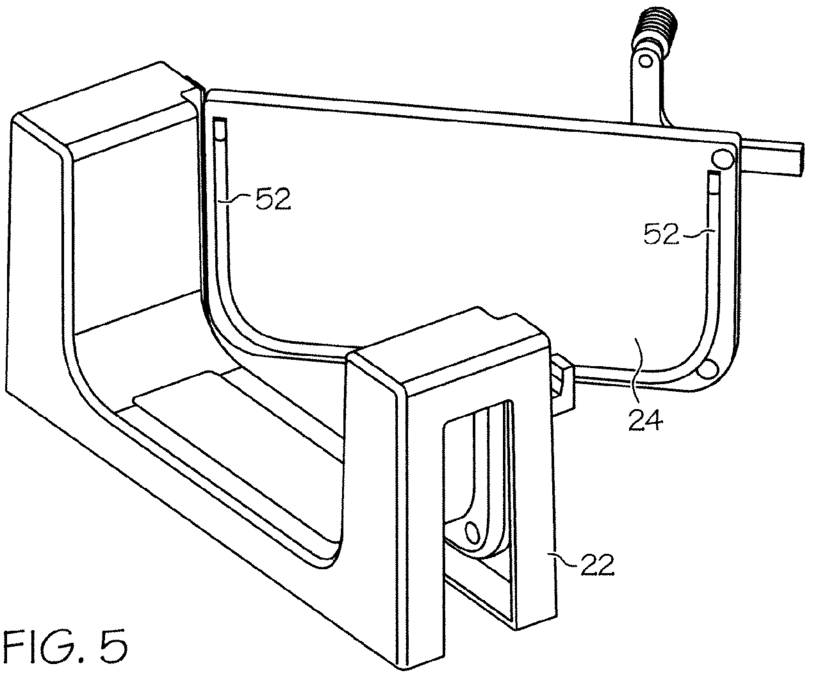
FIG. 5 is an isometric view of an alternate embodiment of a bathtub insert.
Figure 6:
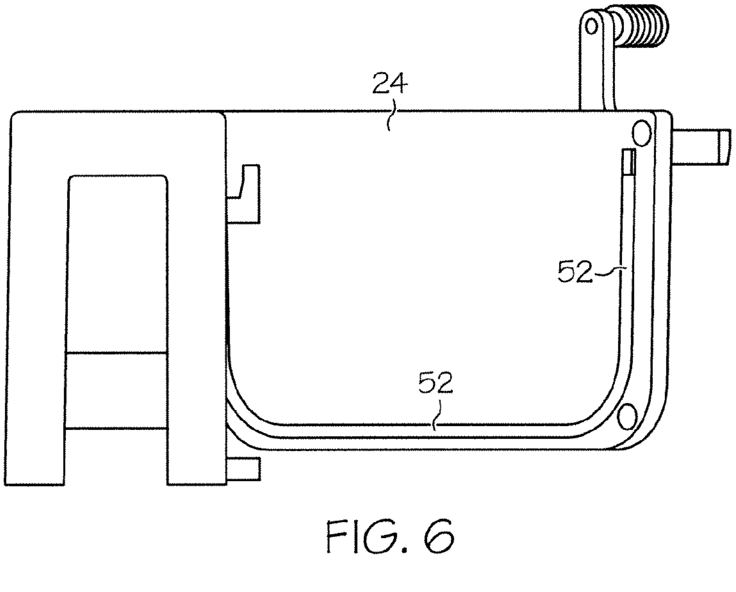
FIG. 6 is a side view of the bathtub insert shown in FIG. 5.
Figure 7:
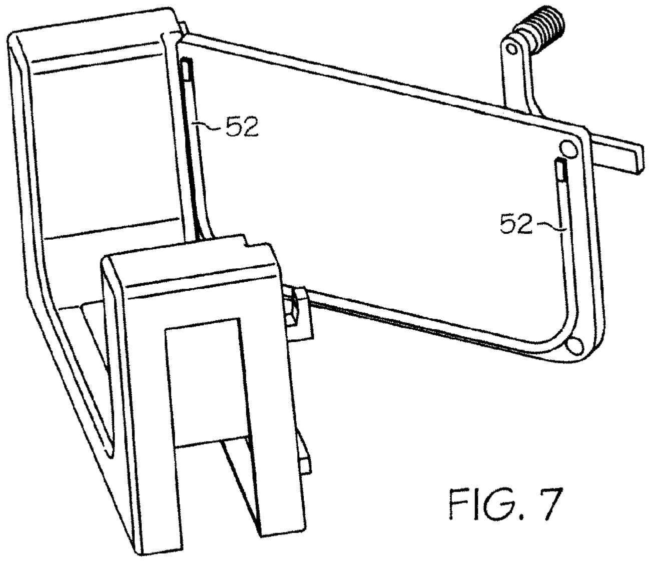
FIG. 7 is an isometric view of the bathtub insert shown in FIG. 5 having a handle.
Figure 8:
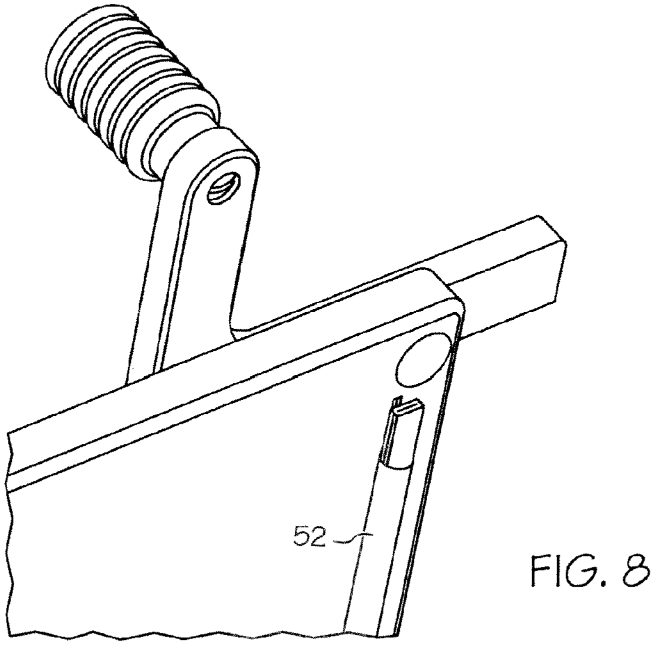
FIG. 8 is a more detailed partial view of the handle of the bathtub insert shown in FIG. 5.
Figure 9:
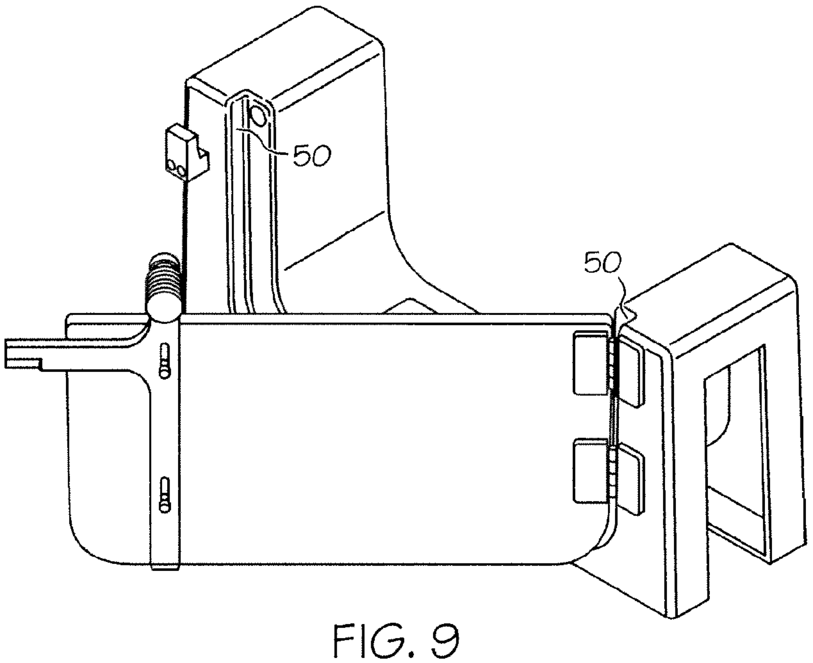
FIG. 9 is an isometric view of the bathtub insert shown in FIG. 5.
Figure 10:
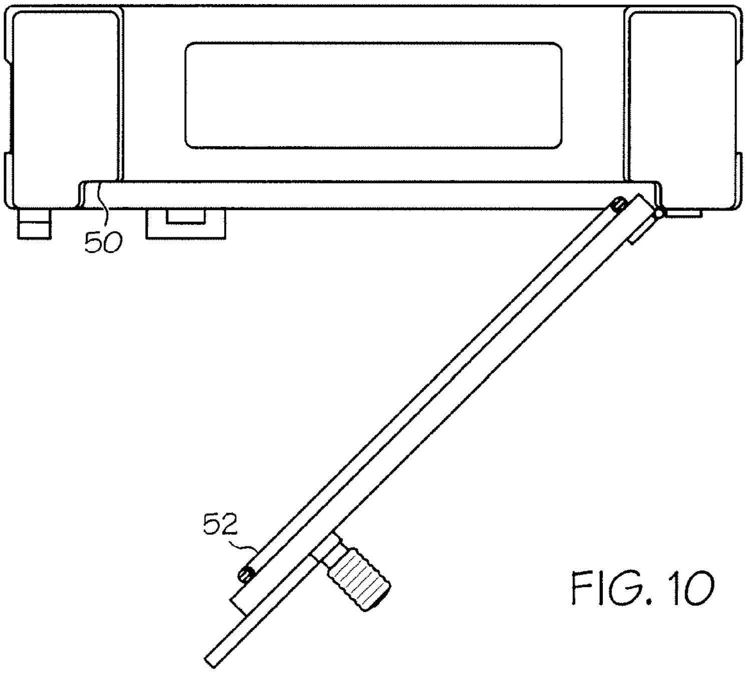
FIG. 10 is a top view of the bathtub insert shown in FIG. 5.

FIG. 4 shows one version of the door 24 in an open position. In this embodiment, the door 24 is closed by positioning it within a recess 50. Recess 50 may be integrally formed as part of step-saddle 22 and may provide a cavity dimensioned to accept the door 24, such that when door 24 is positioned in recess 50, door 24 is flush with step-saddle 22. Referring to FIG. 5, the inner surface of door 24 may also include a seal 52 configured within a channel that, when door 24 is in a closed position, may be compressed tightly against recess 50 of step-saddle 22 to provide a watertight seal. Seal 52 and a corresponding channel may be positioned at any suitable location on door 24 as will be apparent to one of ordinary skill in the art. For example, as shown in FIGS. 6-8, seal 52 may be generally located on the edges of door 24. In another example, seal 52 may be positioned on door 24 to correspond with the position of recess 50 on step-saddle 22. In another example, seal 52 may be located within recess 50 to correspond with the position of door 24. Seals may be placed on the surface of the door 24 such that the seals engage one another when the door is in the closed position or, in an alternative version, the seals may be offset. The one or a plurality of seals 52 may be configured from any suitable material as will be apparent to one of ordinary skill in the art. For example, seal 52 may be made of a hydrophobic polymer. Any suitable number of seals is contemplated where, for example, there may be a seal mounted on door 24 as well as within recess 50 that compress tightly against each other when the door is in a closed position. Alternatively, the seals may be situated adjacent to each other when the door is in the closed position, such that they compress against alternate surfaces. In addition, seal 52 may be magnetized. For example, magnets may be incorporated into the core center of a seal 52. Referring to FIGS. 9-10, seal 52 may be located on door 24 in such a position so as to correspond to the shape of recess 50 on step-saddle 22. In this way, when door 24 is in a closed position, seal 52 may be compressed so as to form a watertight barrier. In another embodiment, seal 52 may be located on step-saddle 22. For example, seal 52 may be located in recess 50. In this way, when door 24 is in a closed position, seal 52 may be compressed so as to form a watertight barrier.

Figure 11:
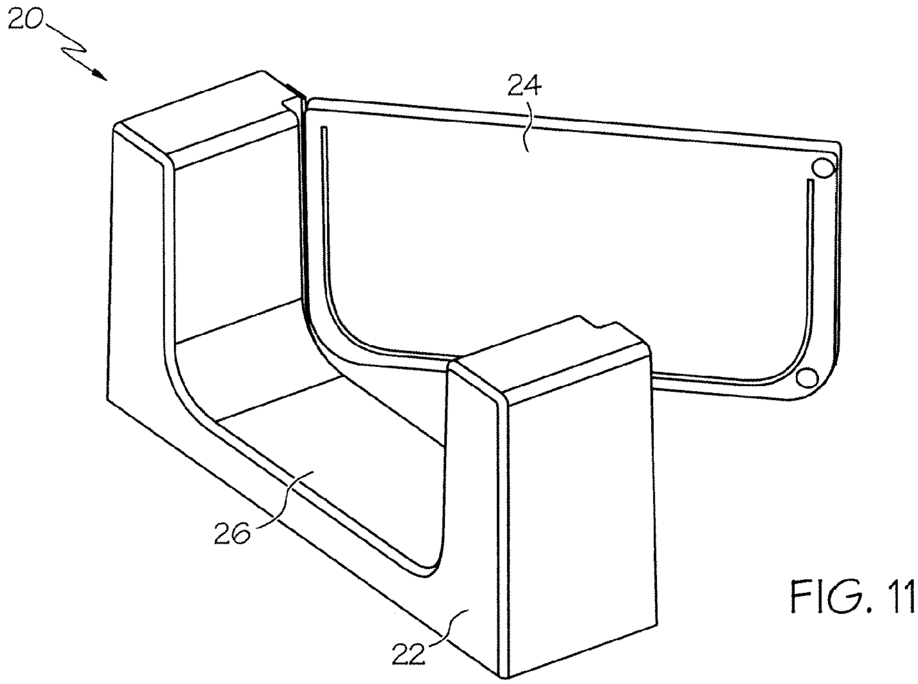
FIG. 11 is an isometric view of an alternate embodiment of a bathtub insert.
Figure 12:
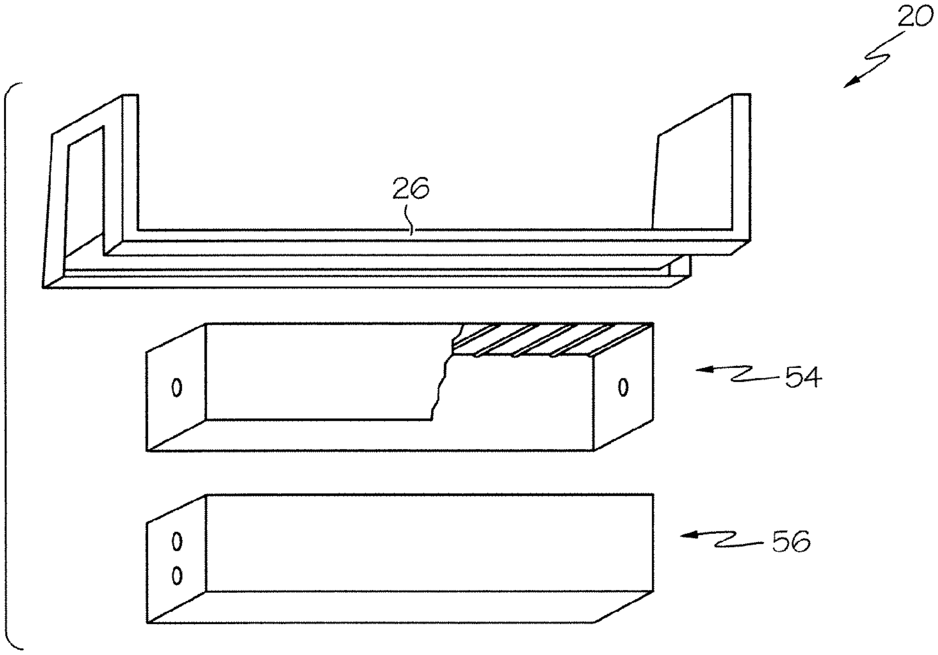
FIG. 12 is an exploded view of one embodiment of a support structure for a bathtub insert.
Figure 13:
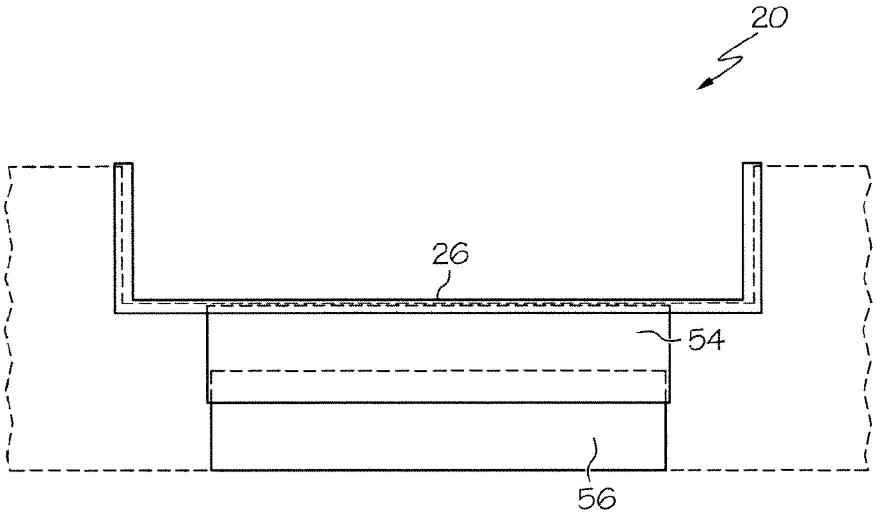
FIG. 13 is a front view of the assembled support structure for the bathtub insert shown in FIG. 12.

Referring to FIG. 11, another version of a bathtub insert 20 is shown. By way of example only, the bathtub insert 20 may be installed in accordance with methods described in U.S. Pat. No. 6,272,698, to Stafford, which is hereby incorporated by reference in its entirety. Although not required, the installation process may include applying a template to a bathtub and cutting a generally U-shaped section out of the existing sidewall of the bathtub. Referring to FIGS. 12-13, bathtub insert 20 may also include an adjustable housing 54 and a support housing 56 as will be described in more detail herein. Once the section of the bathtub has been cut and removed, a support structure comprising two generally rectangular housings may be sized and fit into the open channel extending from the floor to the bottom of bathtub insert 20. These housings may provide support for bathtub insert 20. In an alternate version (not shown), a support system may be implemented that includes a plurality of supporting members that extend from the floor to the bottom or underside of step-plate 26. The supporting members of a support system may be secured to the floor and to the bottom or underside of step-plate 26 in any suitable manner such as, for example, with a sealant or with a fastener. The supporting members may be configured from wood, polymer, plastic, ceramic, metal, or any other suitable material.

In an alternate version (not shown), support bracing for the bathtub insert 20 may be affixed to or otherwise mounted directly on a bathtub. For example, support bracing may be affixed to a sidewall of the bathtub. Such support bracing may be affixed to the bathtub in any suitable manner as will be apparent to one of ordinary skill in the art. For example, support bracing may be adhered to or screwed into a wall of the bathtub. Support bracing may also be made of any suitable material, such as metal support bracing Support bracing may be expandable, like an accordion, to fit the dimensions of a given bathtub and/or cutout portion of the bathtub. In still another version (not shown), support for a bathtub insert 20 may be built into the underside of step-plate 26 such that the support bracing is integral with the step-plate 26. Such support bracing may extend from the underside of step-plate 26 to the floor in, for example, a telescoping configuration. Support bracing may be adjustable to fit the width and/or depth of a given bathtub. The support bracing may have pre-set holes into which tangs on a corresponding brace member fit to correctly size the support structure.

The adjustable housing 54 may be, for example, a rectangular box-like structure extending from the bottom or underside of step-plate 26, through the elongated bottom opening cut in the bathtub for placement of bathtub insert 20 and secured to the bathroom floor or subfloor. It is this adjustable housing 54, in conjunction with a support housing 56, that may provide the improved strength and adjustability afforded by bathtub insert 20. Rather than resting on the edges of the opening cut in the bathtub sidewall, the housings may be configured to rest on the floor or subfloor In one embodiment, the adjustable housing 54 may be a five-sided rectangular box-like structure. Its top panel may mate with or adhere to the bottom of step-plate 26. For added support, the top panel may include transverse ribs incorporated or molded into the panel. These may aid in distributing any load or weight generally attributed to a user of the bathtub. Adjustable housing 54 may also have two side panels and two end panels with an open bottom panel. Exhaust ports for the escape of air when the adjustable-housing is used in conjunction with the support-housing may be located in the end panels. Adjustable housing 54 may fit over and enclose support housing 56 with a snug friction fit and may ultimately be sealed or secured in place to support housing 56. Air, which may be temporarily entrapped in adjustable housing 54, may escape through the exhaust ports. Alternatively, adjustable housing 54 may be secured to support housing 56 in any suitable manner as will be apparent to one of ordinary skill in the art. For example, adjustable housing 54 may be secured to support housing 56 with a sealant or a fastener, such as a screw, a rod, a nut and bolt, a nail, a staple, a brad, or the like.

The support housing 56 may be a rectangular box-like structure similar to the adjustable housing 54. Support housing 56 may feature a pair of side panels, a pair of end panels, and a bottom panel. The bottom panel may be configured for attachment of the support housing 56 to the bathroom floor. An elastomeric sealant may be all that is necessary to fix the support-housing in place, but metal fasteners such as nails, staples, brads, etc., may also be used. Additional ports for the escape of air compressed by the nesting of the support housing 56 within the adjustable housing 54 may be provided in the end panels.

The housings 54 and 56 may rest on the bathroom floor, for example, and may not rest on the edges of the opening cut in the bathtub sidewall. In this way, bathtub insert 20 may permit direct weight to be placed on step-plate 26, as it may be supported by the two housings. Once the two support housings 54 and 56 are properly fit to support the U-shaped box structure (the step-saddle 22 of insert 20), the housings may be secured to the floor. The housings may be secured to the floor in any suitable manner as will be apparent to one of ordinary skill in the art. For example, the housings may be secured with a sealant or with a fastener.

During the installation process, the cavity formed by the removal of the cutout from the side of the tub may be sealed to prevent leakage into the cavity between the tub walls. The cavity may be sealed by providing a plurality of waterproof sheets or pieces that are fashioned together to cover a section of the bathtub that has been cut and removed. The waterproof sheets may have an adhesive or other bonding agent on its surface allowing it to adhere to the bathtub and/or a support housing. Such sheets may be a waterproof membrane similar to materials commonly used for roofing applications. In an alternate version, expandable foam or other suitable materials may be sprayed or applied to the top of the support housings and in the voids in the sidewall on each side where the cutout has been made on the bathtub to provide a watertight seal. Any suitable waterproofing material may be used as will be apparent to one of ordinary skill in the art. For example, materials used to seal the foundation of a house may be utilized to seal the exposed bathtub cavity. In still another version, a plurality of pieces of lumber, Styrofoam, or other suitable material may be cut to fit the open channel and the sidewalls of the bathtub and adhered or fastened to the sides of the bathtub and to the top of the support housings.

Once the section of the bathtub sidewall is removed, the bathtub insert 20 may be sized to fit over the cut opening of the bathtub. This installation step may include cutting or trimming the sides and the bottom of the step-saddle 22 to fit over the section of the bathtub where the cutout has been made. Bathtub insert 20 may then be adhered to both the bathtub and/or to the top of the sealed housings. Bathtub insert 20 may fit into the cut opening in the bathtub without an overlap over the cut section of the tub. A bead of waterproof sealant or caulk may be applied to the entire perimeter along the outer surface of the U-shaped box and the bathtub to provide a watertight barrier.

The installation of bathtub insert 20 may proceed generally as follows, although other methods are contemplated: An opening, generally U-shaped, may be cut in the sidewall of any suitable bathtub. In most instances, a built-in bathtub has three sides encased in or by the surrounding wall with a bottom perimeter that is flush with the floor on the exposed side. It is the exposed side that is chosen for alteration with the bathtub insert 20 to make entry and departure easier. This opening, cut into the exposed sidewall of the bathtub, may extend for a predetermined length within the sidewall and from the top of the sidewall and extend to a predetermined distance above the bottom of the bathtub. These predetermined distances may be generally the dimensions of step-saddle 22. Alternatively, these predetermined distances may be slightly smaller than the dimensions of step-saddle 22 to allow for a secure and watertight coupling.

More specifically, a template may be used to outline the portion of the bathtub sidewall to be removed for the insertion and placement of bathtub insert 20. With the aid of the template, an outline may be drawn on the sidewall of the bathtub, and the defined section may be cut out and removed with the appropriate tools dictated by the composition of the bathtub. A pattern may then be made of the cutout area of the bathtub. The pattern outline may be transferred to the lips (not pictured) on bathtub insert 20 to mirror the cutout section of the bathtub, and the insert 20 may be cut to fit.

Bathtub insert 20, with all of its components, may then be positioned in the cutout of the bathtub and aligned in the void of the cutout. Insert 20 may then be removed to permit a support housing 56 to be secured to the floor or subfloor. A support housing 56 may be secured to the floor in any suitable manner as will be apparent to one of ordinary skill in the art. For example, a support housing 56 may be secured to a floor with sealant or metal fasteners.

Bathtub insert 20 may be repositioned over the cutout opening with the underside of step-plate 26 resting on an edge of the cutout void. The adjustable housing 54 may be bonded to the support housing 56 with a suitable sealant. The entire perimeter of the step-saddle 22 may be joined to the bathtub with a waterproof caulk or sealant to finish the placement of bathtub insert 20. After allowing a suitable period of time for the sealant and/or caulk to crosslink and cure, bathtub insert 20 may be ready for use.

Figure 14:
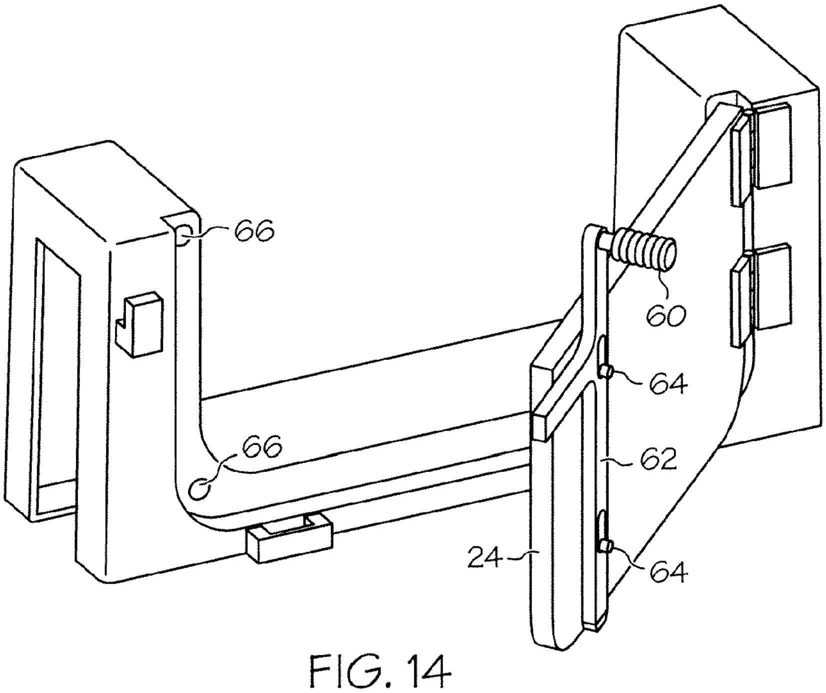
FIG. 14 is an isometric view of the bathtub insert shown in FIG. 5.

Referring to FIG. 14, another example of a bathtub insert 20 is shown. As shown in FIG. 14, bathtub insert 20 may include a handle 60. Handle 60 may facilitate the opening and/or closing of door 24 and may be attached to door 24 in any suitable manner as will be apparent to one of ordinary skill in the art. For example, as shown in FIG. 14, handle 60 may be fashioned as part of a bracket 62 that is secured to door 24 with a fastener 64. Fastener 64 may be, for example, a screw or a bolt. Alternatively, handle 60 may be fashioned as part of door 24 in such a way that handle 60 and door 24 may be considered one integral piece. A strike plate 66 may also be located on the surface of step-saddle 22. For example, FIG. 14 shows two strike plates 66. Such strike plates 66 may serve to bond with a magnet 40 affixed to the inner surface of door 24. In this way, magnets 40 and strike plates 66 may help to secure door 24 in a closed position. In an alternate version, the strike plate 66 may be concealed on the back side of step-saddle 22. Any suitable number and configuration of handles is contemplated where, for example, multiple brackets may be provided to seal the door 24 at locations where leakage is likely to occur. The handle and/or bracket may be configured to translate vertically to lock and unlock the door or, alternatively, may be configured to latch and unlatch the door horizontally.

Figure 15:
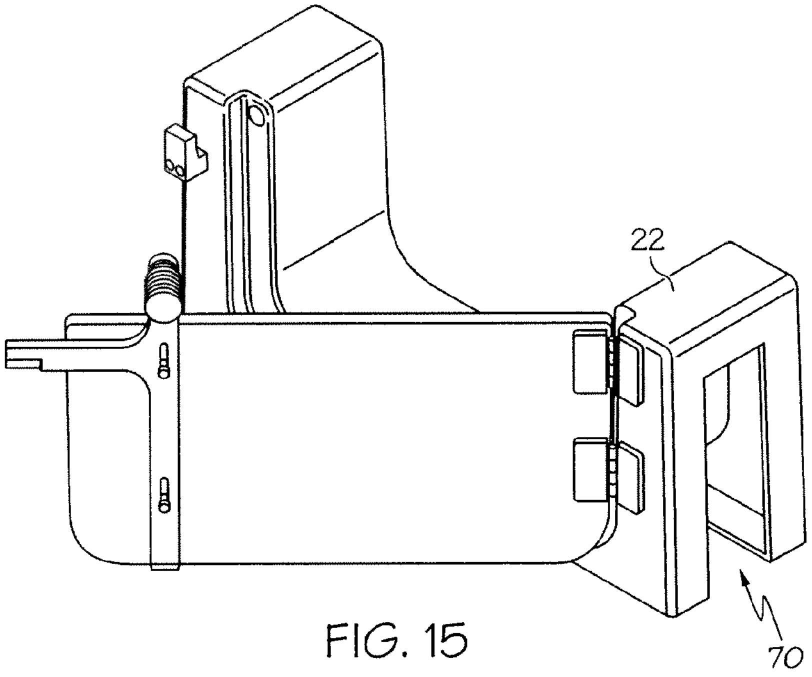
FIG. 15 is an isometric view of the bathtub insert shown in FIG. 5.

Referring to FIG. 15, another version of step-saddle 22 is shown. In this version, in contrast to the step-saddle 22 displayed in FIGS. 1-4 and FIG. 11, step-saddle 22 has an open cavity 70. Such a cavity 70 may run underneath step-plate 26. Such a cavity 70 may provide for quicker installation of bathtub insert 20, as the insert 20 may be easier to trim to needed dimensions. The step-saddle 20 may be solid, have an open cavity, or any other suitable configuration.

Figure 16:
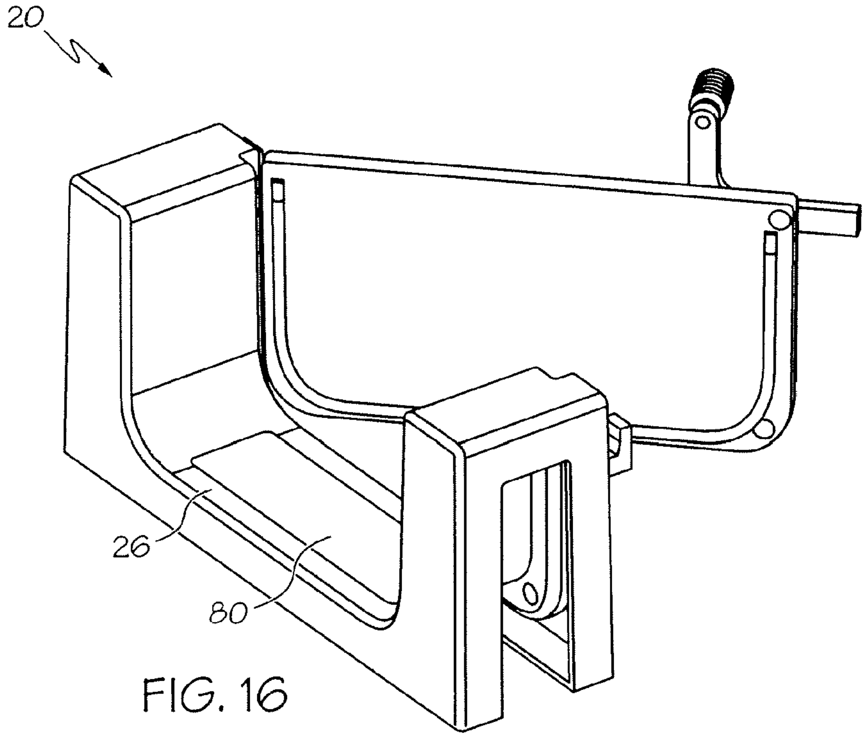
FIG. 16 is an isometric view of an alternate embodiment of a bathtub insert.

FIG. 16 shows another example of a bathroom insert 20. In this example, a tread 80 may be applied to or fashioned as part of the top surface of step-plate 26. Tread 80 may serve to provide traction and/or friction to the surface of step-plate 26. In this way, tread 80 may help prevent a user from slipping and/or falling while stepping on or over step-saddle 22 and into or out of the bathtub. Tread 80 may be configured from any suitable material as will be apparent to one of ordinary skill in the art. For example, tread 80 may be made of fabric, an absorbent material, an aesthetically pleasing material, a removable material, a material with a high coefficient of friction, or the like. Tread 80 may be applied or fabricated as part of step-plate 26 in any suitable manner as will be apparent to one of ordinary skill in the art. For example, tread 80 may be molded into the bathtub insert 20 or may be glued or stapled onto step-plate 26 after the step-plate 26 has been formed, as an aftermarket material. The tread 80 may be permanently affixed to step-plate 26 or it may be removable. The finish on tread 80 may be any suitable finish as will be apparent to one of ordinary skill in the art. For example, tread 80 may have an etched surface.

Figure 17:
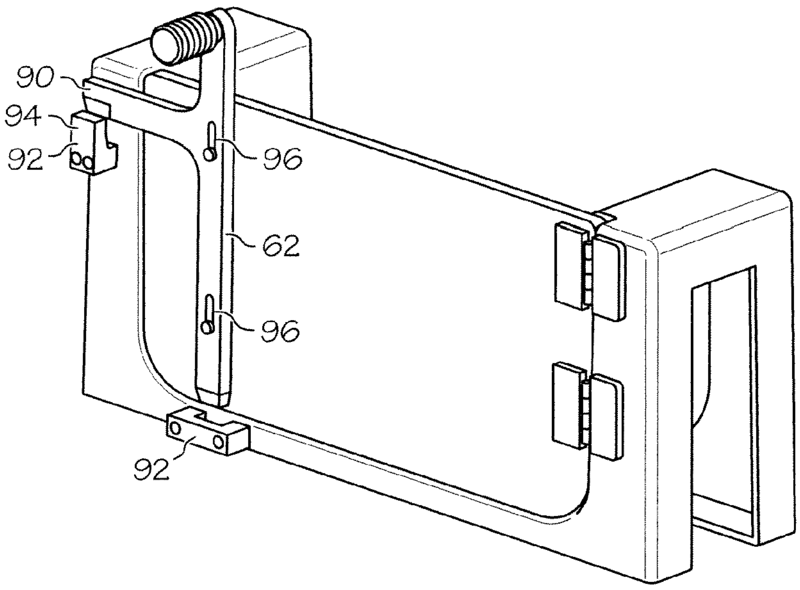
FIG. 17 is an isometric view of the bathtub insert shown in FIG. 16.

In addition to or in place of magnets 40, a bathtub insert 20 may include a latch to secure a closing of door 24. Referring to FIG. 17, one example of a latch 90 is shown. Latch 90 may be, for example, fashioned out of the same bracket 62 to which handle 60 may be fashioned. Alternatively, latch 90 may be completely separate from handle 60. As shown in FIG. 17, when door 24 is in a closed position, latch 90 may be secured by a holder 92. FIG. 17 shows, for example, latch 90 being secured by two holders 92. Holder 92 may include a means for securing a latch 90. For example, FIG. 17 shows holder 92 as including a flange or lip 94 to secure latch 90. Holder 92 may be secured to step-saddle 22 in any suitable manner as will be apparent to one of ordinary skill in the art. For example, as shown in FIG. 17, holder 92 may be screwed into step-saddle 22. Alternatively, holder 92 may be fashioned out of step-saddle 22 in such a way that holder 92 and step-saddle 22 may be considered to be one piece. In addition, bracket 62 may be moveably secured to door 24 in such a way that a user may lift handle 60 (or if a handle 60 is not present, the bracket 62 itself) to release latch 90 from holder 92 to move door 24 into an open position. Conversely, a user may push handle 60 (or if handle 60 is not present, the bracket 62 itself) down to secure latch 90 in holder 92 and therefore, close, and secure door 24. In another example, a user may place latch 90 in holder 92 to secure the closed door 24. Bracket 62 may be moveably secured to door 24 to allow for such movement of latch 90 by screwing or otherwise fastening bracket 62 to door 24 through a cutout 96 in bracket 62.

Figure 18:
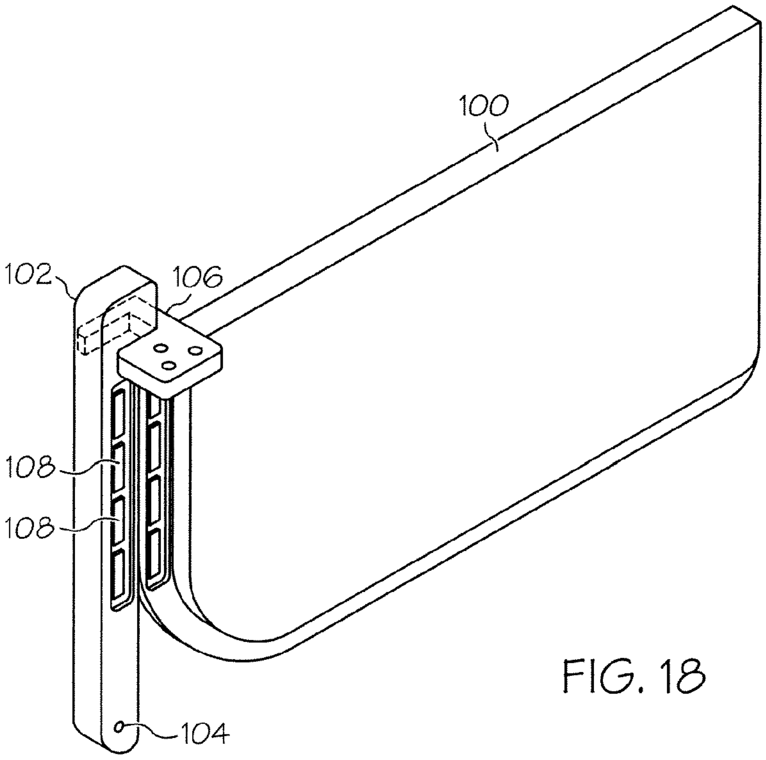
FIG. 18 is an isometric view of one embodiment of a door and handle assembly for a bathtub insert.

Referring to FIG. 18, another example of a bathtub door 100 is shown that may be associated with any suitable frame (not shown). As shown in FIG. 18, the bathtub door 100 may be associated with a handle 102. Handle 102 may facilitate the opening and/or closing of door 100 and may be attached to door 100 in any suitable manner as will be apparent to one of ordinary skill in the art. For example, as shown in FIG. 18, handle 102 may be pivoted about a frame coupling 104 that attaches the handle 102 to the frame. The handle 102 may be pivoted such that it engages a latch 106 that is secured to the frame. Referring to FIG. 18, the handle 102 is shown in the "closed" position, where the handle is engaged with the latch 106 to secure the door 100 against the frame and, thus, prevent the door 100 from opening.

In one version, the handle 100 further includes one or a plurality of magnets 108 that are associated with corresponding magnets embedded or otherwise associated with the frame (not shown). When in the "closed position", the magnets 108 in the handle 100 are configured to align with the corresponding frame magnets to secure the handle 100 in the "closed position". In one version, to open the door the handle 100 must be pivoted away from a friction fit latch 106 and must also overcome the coupling of the magnets 108. It will be appreciated that any suitable magnet 108 arrangement is contemplated, where a second set of frame magnets (not shown) may be associated with the frame to secure the handle 100 when in the "open position" In this manner, the handle 100 is configured to securely hold the door 100 against the frame to prevent leakage, where the magnets 108 prevent the handle 100 from being accidentally opened.

Figure 19:
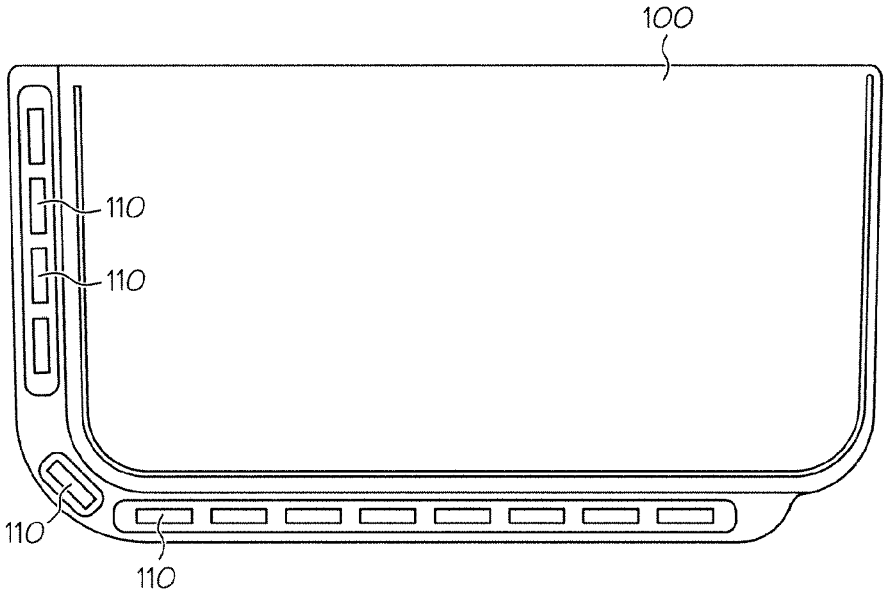
FIG. 19 is a rear view of the door of FIG. 18 shown with magnets positioned along the periphery of the insert door.

Referring to FIG. 19, the door 100 includes a plurality of door magnets 110 arranged around the periphery of the door 100 to secure the door 100 to a frame or step saddle (not shown). The door magnets 110 are associated with corresponding magnets imbedded in the frame such that when the door 100 is in the "closed position" the magnetic coupling resists accidental opening of the door 100. The door magnets 110 may be embedded within the door, attached to the outside surface of the door, or otherwise configured to provide a secure attachment between the door 100 and the frame. It will be appreciated that the door 100, handle 102, and latch 106 may be used with any suitable frame such as, for example, those described herein.

Figure 20:
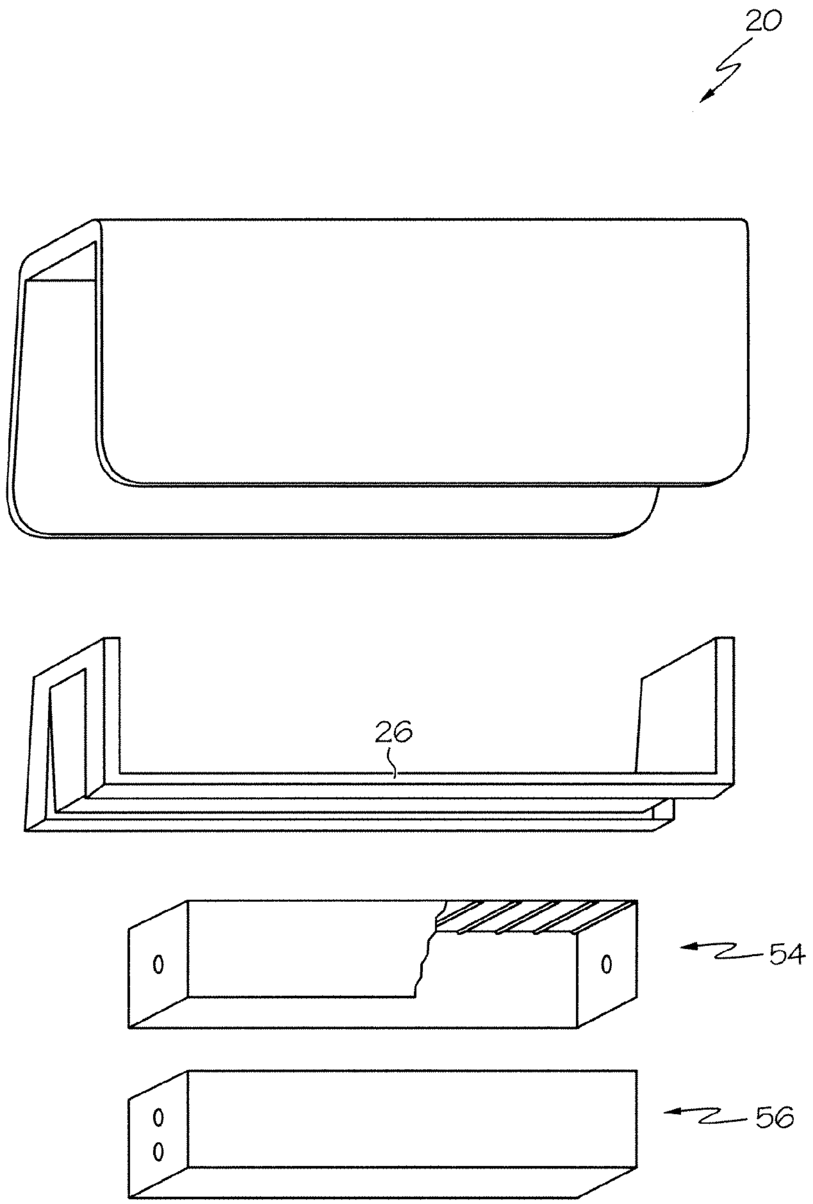
FIG. 20 is an exploded view of one embodiment of a bathtub insert, a support structure for the bathtub insert, and a retrofit covering.
Figure 21:
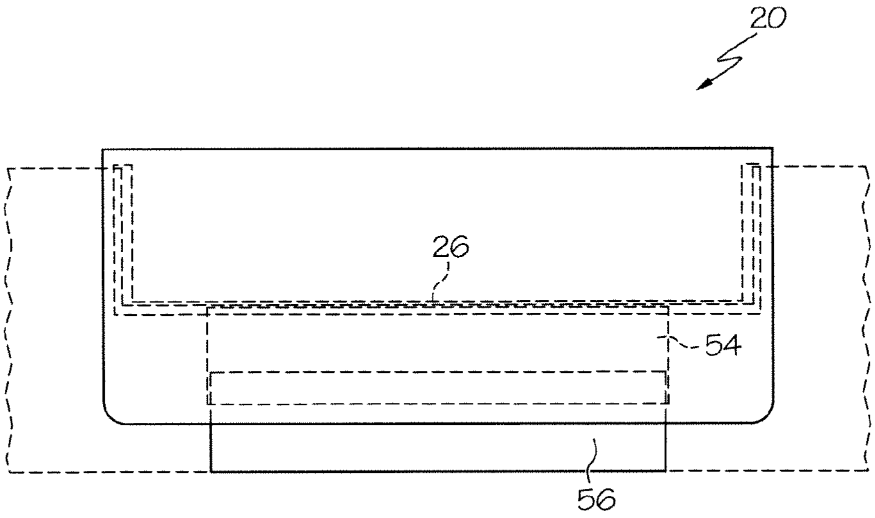
FIG. 21 is a front view of the assembled support structure, bathtub insert, and retrofit covering shown in FIG. 20.
Figure 22:
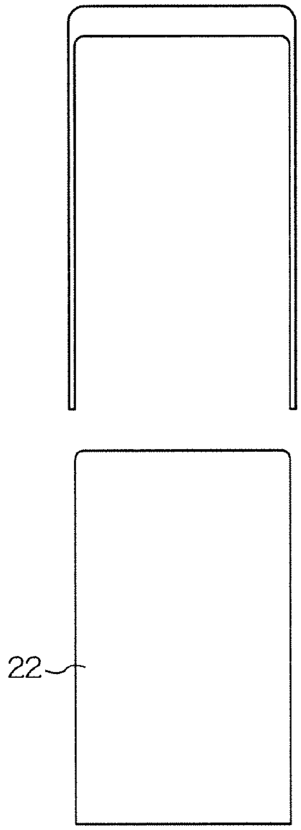
FIG. 22 is a side view of the retrofit covering of FIG. 20 shown prior to placement over the bathtub insert.

FIGS. 20-22 show an embodiment using a retrofit covering. FIG. 20 is an exploded view of one embodiment of a step plate 26, a support structure for the bathtub insert having an adjustable house 54 and support housing 56, and a retrofit covering. FIG. 21 is a front view of is a front view of the assembled support structure, bathtub insert, and retrofit covering shown in FIG. 20. FIG. 22 is a side view of the retrofit covering of FIG. 20 shown prior to placement over the bathtub insert.

Figure 23:
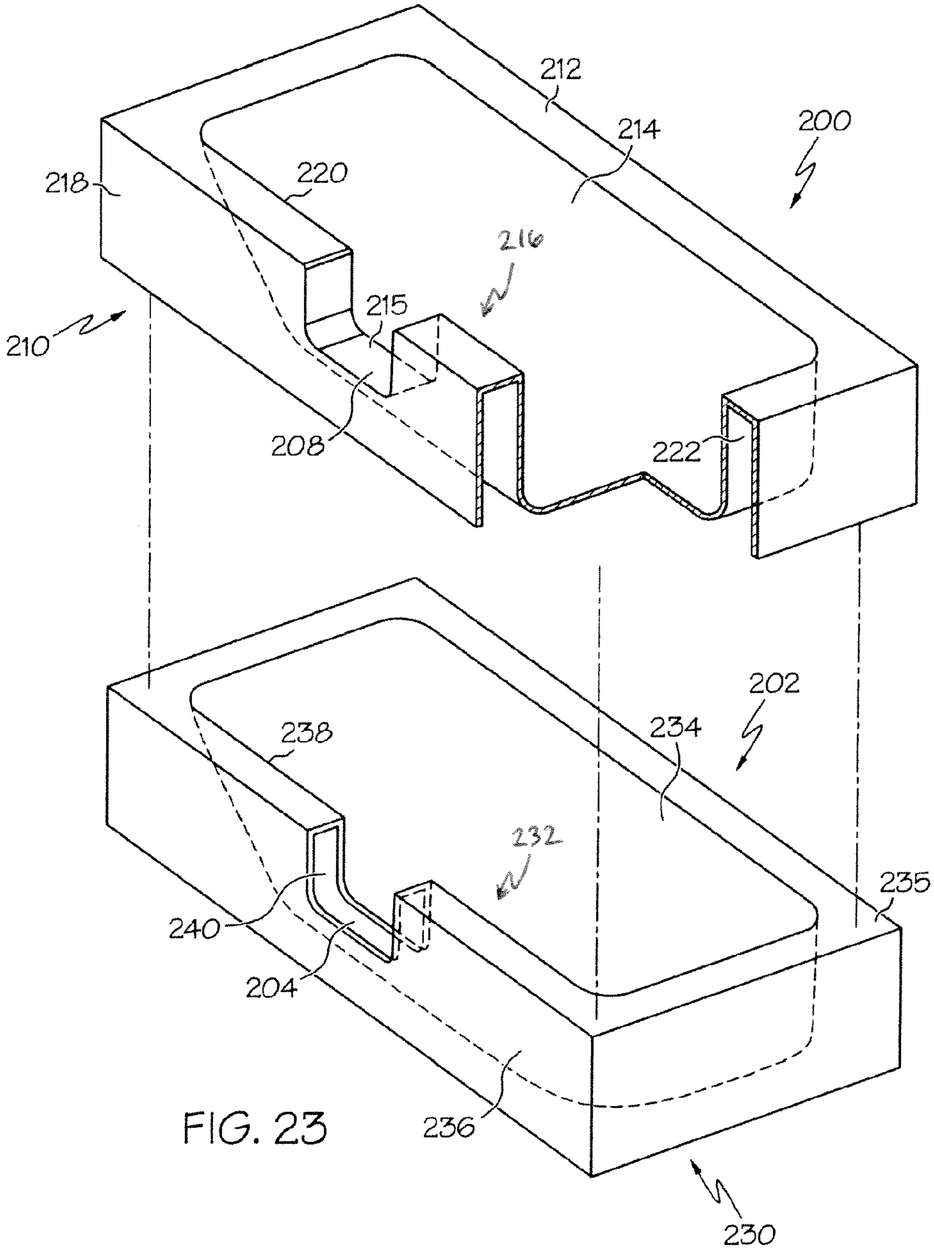
FIG. 23 is an exploded view of one embodiment of an overlay configured for placement over a bathtub.

FIG. 23 illustrates one embodiment of a tub liner, bathtub insert, or overlay 200 that can be used to cover all or a limited portion of a bathtub 202. The overlay 200 can include a body 210 having a sidewall 216 extending around the perimeter of a basin 214. As shown in FIG. 23, the sidewall 216 can include a top wall 212, an outer wall 218, and an inner wall 220. The top wall 212, the outer wall 218, and the inner wall 220 can cooperate to define a channel or internal cavity 222 such that the body 210 can be partially or substantially hollow. The sidewall 216 can further define an opening 215 in the top wall 212, the outer wall 218, and the inner wall 220 that can facilitate ingress and egress from a bathtub. As shown in FIG. 23, the opening 215 can have a substantially U-shaped configuration defined by the sidewall 216, however, it will be appreciated that any suitable shape or configuration is contemplated.

The bathtub 202 can include a body 230 having a sidewall 232 extending around the perimeter of a basin 234. The sidewall 232 can include a top wall 235, an outer wall 236, and an inner wall 238. The sidewall 232 can define an opening 204 in the top wall 235, the outer wall 236, and the inner wall 238 that can facilitate ingress and egress from a bathtub. As shown, the opening 204 can have a substantially U-shaped configuration as defined by the sidewall 232, however, it will be appreciated that any suitable shape or configuration is contemplated. The opening 204 can be, for example, formed by removing a portion of an existing bathtub 202, cutting away a portion of an existing bathtub 202, or providing a bathtub manufactured with opening 204. It will be appreciated that any suitable shape, number, or configuration of openings or cutouts can be provided in accordance with embodiments described herein.

Still referring to FIG. 23, the overlay 200 can be configured for placement over the bathtub 202 where the internal cavity 222 of the overlay 200 can receive the sidewall 232 of the bathtub 202. The overlay 200 and internal cavity 222 can be sized such that positioning the overlay 200 over the bathtub 202 covers all or a limited portion of the top wall 235, outer wall 236, and/or inner wall 238. As shown, the opening 208 can be aligned with the opening 204 when the overlay 200 is positioned over the bathtub 202 to facilitate ingress and egress from the bathtub 202 by, for example, a disabled or geriatric user.

The opening 204 can be cut out of a standard bathtub 202, where the overlay 200 can be operable to seal a cavity 240 in the body 230 that is defined by the top wall 235, outer wall 236, and inner wall 238. For example, the opening 208 in the overlay can be defined by a perimeter wall 215, extending generally downward from the top wall 235, that can generally or substantially correspond to the shape of the opening 204. For example, after positioning the overlay 200 over the bathtub 204, a line of caulk or other suitable sealant or adhesive can be used to permanently or detachably couple the overlay 200 to the bathtub 202. Providing an overlay 200 in accordance with embodiments described herein can allow for an existing bathtub 202 to be cut away to form an access opening and then retrofit with an aesthetically pleasing overlay 200 that retains the functionality of the access opening.

The opening can be a pre-formed feature of the bathtub 202, where the overlay 200 can be used to change the aesthetic look of the bathtub 202 while retaining the functional benefits of having an opening 208 and/or to provide additional features such as a door or an attachment point for accessories. The overlay 200 can be a single pre-formed component as illustrated in FIG. 23 or, for example, can be configured from multiple components (not shown) that are connected, fused, or otherwise engaged to cover all or a limited portion of the bathtub 202. The overlay 200 can be configured for the engagement of accessories (not shown) and/or can be integral with bath accessories such as a swivel seat, a grab bar, support bars, safety features, article holders, or the like. Overlay 200 can have any suitable aesthetic look and can include functional and/or ornamental surface effects including slip resistant regions. In one embodiment (not shown), the body of the overlay can have a pivotally attached door, such as the door illustrated in FIG. 14. Any suitable cover, door, capsule, and/or accessory can be used in association with, or can be integral with, the overlay 200. The overlay 200 can be permanently attached to the bathtub 202 or, in an alternate embodiment, can be selectively removable from the bathtub 202. In one embodiment, the geometry of the internal cavity 222 of the overlay 202 can substantially correspond to the geometry of the sidewall 232 of the bathtub 202. However, it will be appreciated that the overlay 202 can have any suitable shape and can be sized to universally accept bathtubs having varying geometries and thicknesses Overlay 200 can also include modifications to the geometry of the original bathtub 202 where, for example, overlay 200 can have a modified cavity or basin 214, a modified sidewall 218, or any other desirable shape or configuration designed for aesthetic and/or functional purposes.

Figure 24:
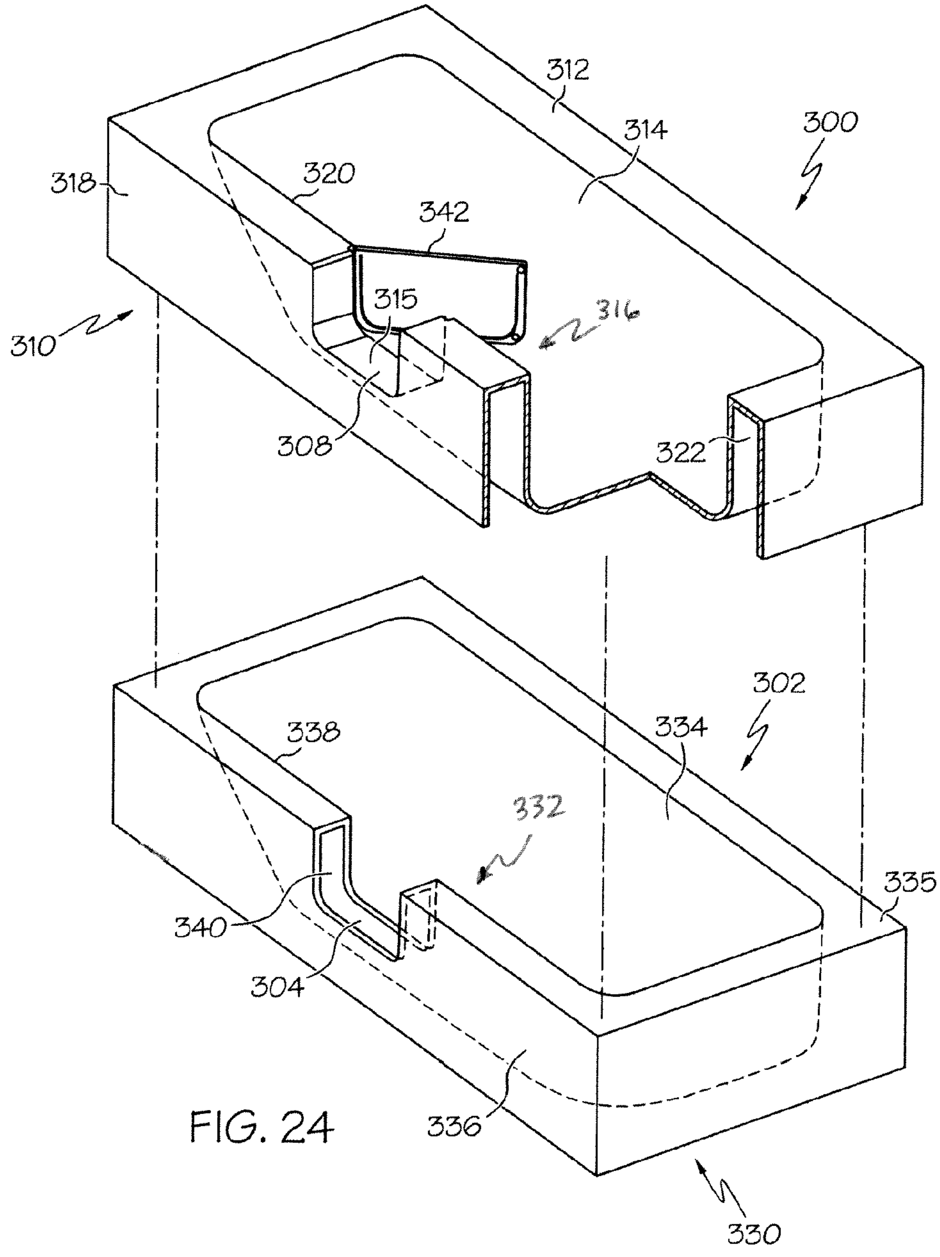
FIG. 24 is an exploded view of an alternate embodiment of an overlay having a door configured for placement over a bathtub.

FIG. 24 illustrates one embodiment of a tub liner, bathtub insert, or overlay 300 that can be used to cover all or a limited portion of a bathtub 302. The overlay can include a body 310 having a sidewall 316 extending around the perimeter of a basin 314. As shown, the sidewall 316 can include a top wall 312, an outer wall 318, and an inner wall 320. The top wall 312, the outer wall 318, and the inner wall 320 can cooperate to define a channel or internal cavity 322 such that the body 310 can be partially or substantially hollow. The sidewall 316 can further define an opening 308 in the top wall 312, the outer wall 318, and the inner wall 320 that can facilitate ingress and egress from a bathtub. As shown, the opening 308 can have a substantially U-shaped configuration as defined by the sidewall 316, however, it will be appreciated that any suitable shape or configuration is contemplated. As shown, a door 342 can be pivotally coupled with the body 310 of the overlay 300. The door 342 can be selectively movable between an open position and a closed position such that when the door 342 is in the closed position the bathtub 302 can be used and filled in a traditional manner. Pivoting the door 342 to the open position can facilitate ingress and egress from the bathtub. In this manner, the door 342 can provide the benefits of a lowered entry point into the bathtub 302 while still preserving the use of a fillable bathtub 302. It will be appreciated that the door 342 and/or overlay 300 can include any suitable accessories (not shown) associated with the door 342 including a latch, a handle, a locking member, or the like.

The bathtub 302 can include a body 330 having a sidewall 332 extending around the perimeter of a cavity or basin 334. The sidewall 332 can include a top wall 335, an outer wall 336, and an inner wall 338. The sidewall 332 can define an opening 304 in the top wall 335, the outer wall 336, and the inner wall 338 that can facilitate ingress and egress from a bathtub. As shown, the opening 304 can have a substantially U-shaped configuration as defined by the sidewall 332. However, it will be appreciated that any suitable shape or configuration is contemplated. The opening 304 can be, for example, formed by removing a portion of an existing bathtub 302, cutting away a portion of an existing bathtub 302, or providing a bathtub manufactured with opening 304. It will be appreciated that any suitable shape, number, or configuration of openings or cutouts can be provided in accordance with embodiments described herein.

Still referring to FIG. 24, the overlay 300 can be configured for placement over the bathtub 302, where the internal cavity 322 of the overlay 300 can receive the sidewall 332 of the bathtub 302. The overlay 300 and internal cavity 322 can be sized such that positioning the overlay 300 over the bathtub 302 covers all or a limited portion of the top wall 335, outer wall 336, and/or inner wall 338. As shown, the opening 308 can be aligned with the opening 304 when the overlay 300 is positioned over the bathtub 302 to facilitate ingress and egress from the bathtub 302 by, for example, a disabled or geriatric user.

Where the opening 304 is cut out of a standard bathtub 302, the overlay 300 can be operable to seal a cavity 340 in the body 330 that is defined by the top wall 335, outer wall 336, and inner wall 338. For example, the opening 308 in the overlay can be defined by a perimeter wall 315, extending generally downward from the top wall 335, that generally or substantially corresponds to the shape of the opening 304. After positioning the overlay 300 over the bathtub 304, a line of caulk or other suitable sealant or adhesive can be used to permanently or detachably couple the overlay 300 to the bathtub 302. Providing an overlay 300 in accordance with embodiments described herein can allow for an existing bathtub 302 to be cut away to form an access opening and then retrofit with an aesthetically pleasing overlay 300 having a door 342 that retains the functionality of the access opening with the use of a fillable bathtub.

Figure 25:
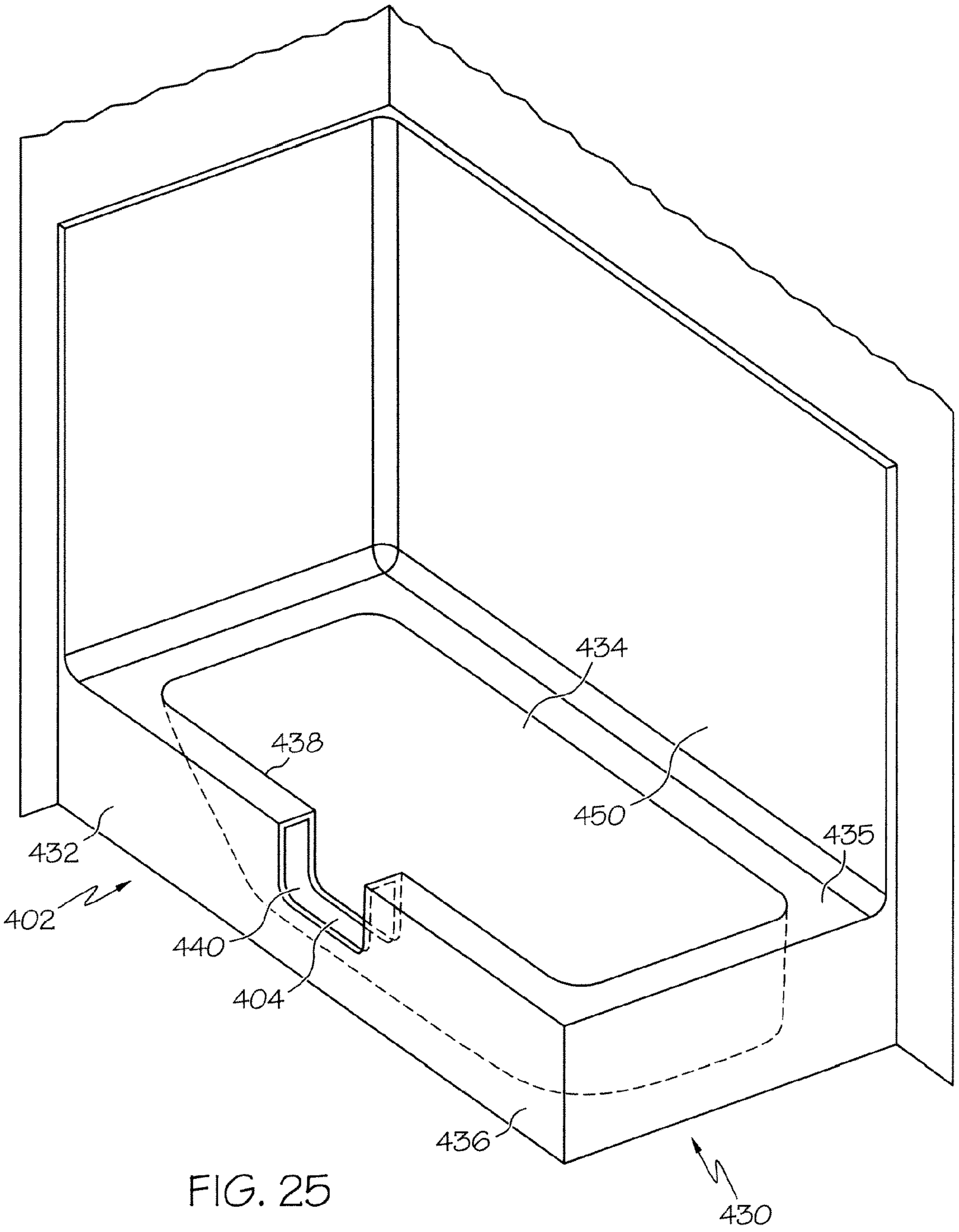
FIG. 25 is a perspective view of one embodiment of a bathtub positioned adjacent two walls of a bathroom.

FIG. 25 illustrates one embodiment of a bathtub 402 that can include a body 430 having a sidewall 432 that together with a bottom surface defines a cavity or basin 434. The sidewall 432 can include a top wall 435, an outer wall 436, and an inner wall 438. The sidewall 432 can define an opening 404 in the top wall 435, the outer wall 436, and the inner wall 438 that can facilitate ingress and egress from the bathtub 402. As shown, the opening 404 can have a substantially U-shaped configuration as defined by the sidewall 432, however, it will be appreciated that any suitable shape or configuration is contemplated. The opening 404 can be, for example, formed by removing a portion of an existing bathtub 402, cutting away a portion of an existing bathtub 402, or providing a bathtub manufactured with opening 404. It will be appreciated that any suitable shape, number, or configuration of openings or cutouts can be provided in accordance with embodiments described herein.

Figure 26:
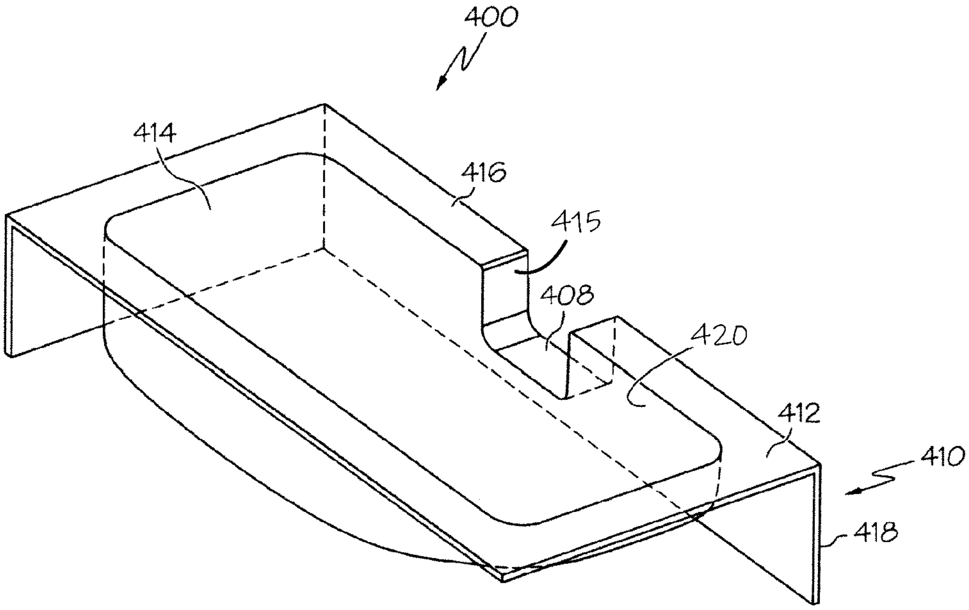
FIG. 26 is a perspective view of one embodiment of an overlay configured for placement over the bathtub shown in FIG. 25.

FIG. 26 illustrates one embodiment of a tub liner, bathtub insert, or overlay 400 that can be used to cover all or a limited portion of the bathtub 402 (FIG. 25). The overlay can include a body 410 that together with a bottom surface defines a cavity or basin 414. As shown, the sidewall 416 can include a top wall 412, an outer wall 418, and an inner wall 420. The outer wall 418 can extend partially around the perimeter of the top wall 412 to accommodate a bathtub 402 that is positioned adjacent one or a plurality of walls. It will be appreciated that the overlay 400 can have any suitable shape and/or configuration to cover all or a limited portion of bathtubs adjacent one or a plurality of walls. It will be appreciated that the overlay 400 can have any suitable shape or configuration to cover circular bathtubs, elliptical bathtubs, or bathtubs having any other suitable geometry or placement.

The sidewall 416 of the overlay 400 can further define an opening 408 in the top wall 412, the outer wall 418, and the inner wall 420 that can facilitate ingress and egress from the bathtub 402. As shown, the opening 408 can have a substantially U-shaped configuration that can be defined by the sidewall 416, however, it will be appreciated that any suitable shape or configuration is contemplated Still referring to FIG. 26, the overlay 400 can be configured for placement over the bathtub 402 (FIG. 25), where the overlay 400 can be sized such that positioning the overlay 400 over the bathtub 402 can cover all or a limited portion of the top wall 435, outer wall 436, and/or inner wall 438. As shown, the opening 408 can be aligned with the opening 404 when the overlay 400 is positioned over the bathtub 402 to facilitate ingress and egress from the bathtub 402 by, for example, a disabled or geriatric user.

Where the opening 404 is cut out of a standard bathtub 402, the overlay 400 can be operable to seal a cavity 440 in the body 430 that can be defined by the top wall 435, outer wall 436, and inner wall 438. For example, the opening 408 in the overlay can have a perimeter wall 415 that can generally or substantially correspond to the shape of the opening 404 such that the perimeter wall 415 can substantially close off the cavity 440. After positioning the overlay 400 over the bathtub 404, a line of caulk or other suitable sealant or adhesive can be used to permanently or detachably couple the overlay 400 to the bathtub 402. Providing an overlay 400 in accordance with embodiments described herein can allow for an existing bathtub 402 to be cut away to form an access opening and then retrofit with an aesthetically pleasing overlay 400.

In some embodiments, a tub liner may comprise one or more additional features to assist a user, to ease the bathing experience for the user, or to otherwise aid a user or a caregiver Such assistance features that may be integral, unitary, or otherwise coupled, to various tub liners may include, for example, seats, ramps, steps, handrails, gripping structures, benches, shower doors, and so forth. Some embodiments may incorporate a plurality of additional assistance features, such as a molded seat, a grab bar, and a step, for example. Other embodiment may include, for example, a molded seat and a ramp.

Figure 27:
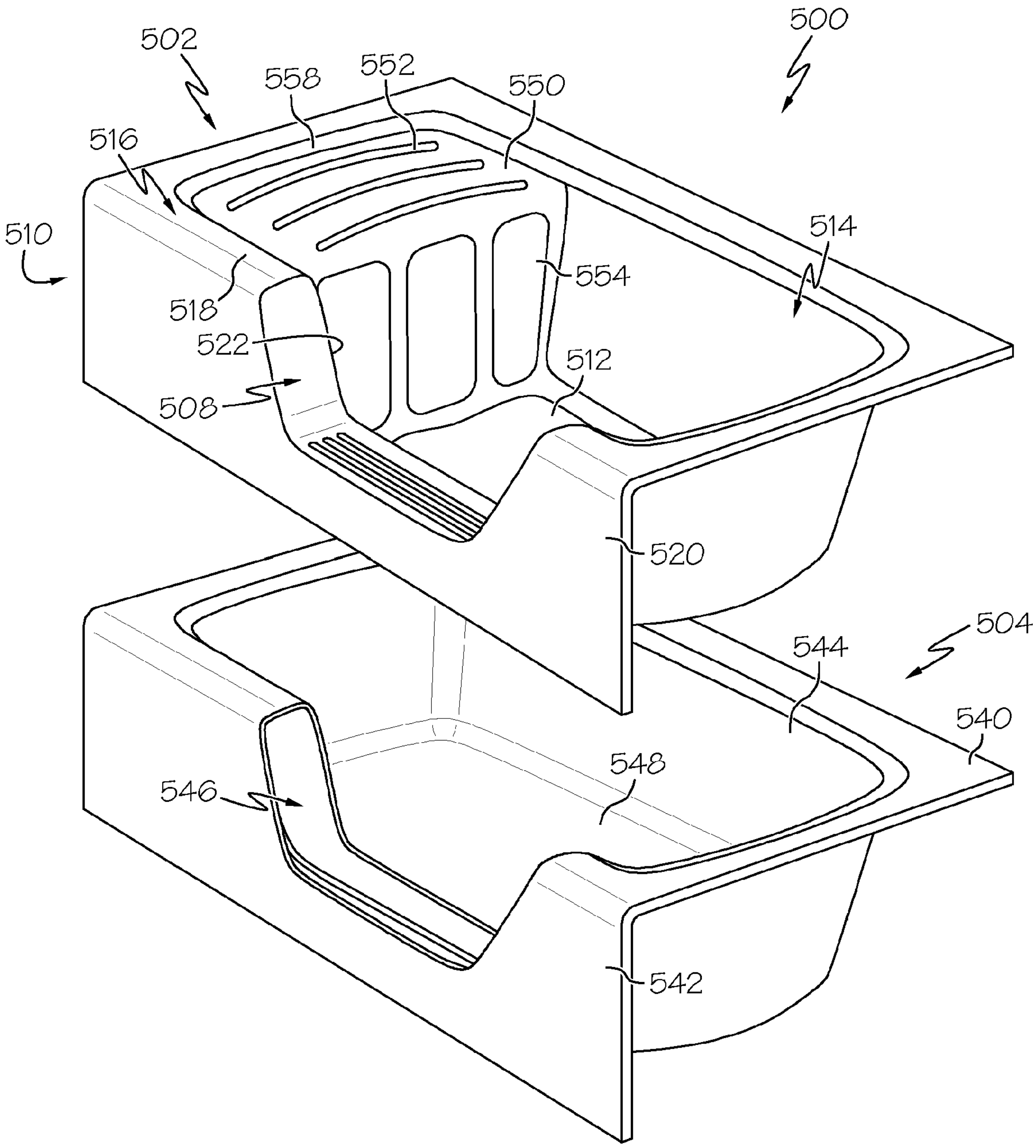
FIG. 27 is an exploded view of one embodiment of an overlay having an assistance feature, the overlay configured for placement over a bathtub.

FIG. 27 illustrates one embodiment of a tub liner, bathtub insert, or overlay 500 having an assistance feature 502 that can be used to cover all or a limited portion of the bathtub 504. The overlay can include a body 510 that together with a bottom surface 512 defines a cavity or basin 514. A sidewall 516 can include a top wall 518, an outer wall 520, and an inner wall 522. The outer wall 520 can extend partially around the perimeter of the top wall 518 to accommodate a bathtub 504 that is positioned adjacent one or a plurality of walls. It will be appreciated that the overlay 500 can have any suitable shape and/or configuration to cover all or a limited portion of bathtubs adjacent one or a plurality of walls. It will be appreciated that the overlay 500 can have any suitable shape or configuration to cover circular bathtubs, elliptical bathtubs, or bathtubs having any other suitable geometry or placement.

Similar to previously described embodiments, the sidewall 516 of the overlay 500 can further define an opening 508 in the top wall 518, the outer wall 520, and the inner wall 522 that can facilitate ingress and egress from the bathtub 504. As shown, the opening 508 can have a substantially U-shaped configuration that can be defined by the sidewall 516, however, it will be appreciated that any suitable shape or configuration is contemplated.

The assistance feature 502 of the overlay 500 illustrated in FIG. 27 is a molded seat having a sitting surface 550. The sitting surface 550 may be contoured to accommodate a user and may include, for example, protrusions 552 to assist the user with remaining properly positioned during the bathing process. The protrusion 552 may be, for example, knurls, ridges, or a combination of both. The sitting surface 550 may be substantially parallel to the bottom surface 512 of the overlay 500. The sitting surface 550 may also be integral with a portion of the inner wall 522. A lip surface 558 may extend between the sitting surface 550 and the top wall 518. As is to be appreciated, the lip surface 558 may vary in size and shape depending on the placement of the sitting surface 550 (i.e., the size of the seat). For example, if the sitting surface 550 is positioned closer to the bottom surface 512, the lip surface 558 will be larger and, if the lip surface 558 is large enough, may service as a backrest for a user. In some embodiments, the sitting surface 550 is generally aligned with the top wall 518 such that there is no lip surface 558. The assistance feature 502 may also comprise a vertical surface 554 that joins the sitting surface 550 with the bottom surface 512. The vertical surface 554 may be substantially perpendicular to the bottom surface 512 or may be slanted with respect to the bottom surface. In some embodiments, the vertical surface 554 may be a combination of perpendicular and slanted surfaces. The vertical surface 554 may be contoured to receive a portion of a user's legs during the bathing process.

Still referring to FIG. 27, and similar to the embodiments described above, the overlay 500 can be configured for placement over the bathtub 504, where the overlay 500 can be sized such that positioning the overlay 500 over the bathtub 504 can cover all or a limited portion of the top wall 540, outer wall 542, and/or inner wall 544. As shown, the opening 508 can be aligned with an opening 546 of the bathtub 504 when the overlay 500 is positioned over the bathtub 504 to facilitate ingress and egress from the bathtub 504 by, for example, a disabled or geriatric user. The user may sit on the sitting surface 550 during the bathing process.

In some embodiments, the overlay 500 may further comprise a door, blocking member, other type of cover. For example, a door similar to door 24 (FIG. 1) may be utilized. The door 24 may be coupled to overlay may be configured such that after a bather has entered the tub, a seal of the opening 508 may be provided. This door or blocking member may be affixed proximate the opening 508 in any suitable manner such as, for example, with a magnet, seal, or both. In another version, a capsule or covering may selectively cover the opening 508. The capsule or covering may be hinged or may be a retrofit component that is placed over a portion of the overlay 500 to seal the opening 508.

Figure 28:
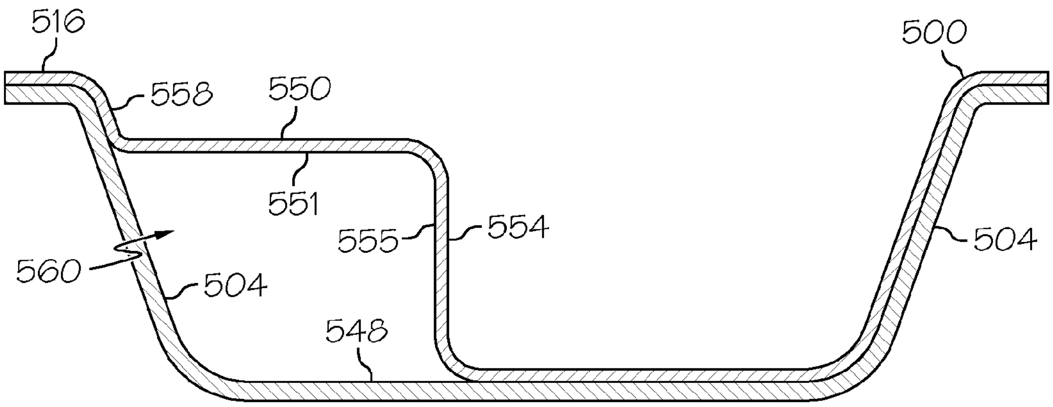
FIG. 28 is a cross-sectional view of the overlay positioned over the bathtub of FIG. 27 taken along the longitudinal axis.

FIG. 28 shows a cross-sectional side view along the longitudinal axis of the overlay 500 positioned over the bathtub 504. As illustrated, once the overlay 500 is positioned, a cavity 560 may be defined between the undersurface 551 of the sitting surface 550, the inner wall 544 of the bathtub, the bottom surface 550 of the bathtub 504, and the inner surface 555 of the vertical surface 554. In some embodiments, additional structural support may be used in the cavity 560 to add to the structural rigidity of the seating surface 550. The structural support may be an additional piece or collection of pieces added into the cavity 560 during installation, for example. The structural support may be a molded piece, a frame, a brace, a plurality of stacked or interlocking pieces, and so forth. In some embodiments, structural support may be unitary with, or otherwise coupled to, the overlay. The structural support may be adjustable such that the overlay 500 may accommodate a variety of bathtub configurations.

Figure 29:
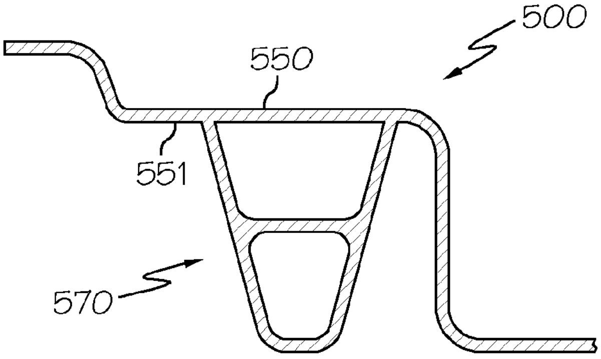
FIG. 29 is a cross-sectional view taken along the longitudinal axis of an overlay that includes integral structural support.

FIG. 29 shows a cross-sectional side view taken along the longitudinal axis of the overlay 500 which includes integral structural support 570. The structural support 570 may be unitary (e.g., molded) to the undersurface 551 of the sitting surface 550. The integral structural support 570 may extend from the undersurface of the sitting surface 550 and be dimensioned to communicate with the bottom surface 548 (FIG. 28) of the bathtub 504 once the overlay 500 is installed. In some embodiments, the structural support may be independent from the sitting surface 550 and positioned between the undersurface of the sitting surface 550 and the bottom surface 548 of the bathtub 504 during installation of the overlay 500. In some embodiment, the structural support is bonded to at least one of the undersurface of the sitting surface 550 and the bottom surface 548 of the bathtub to reduce movement of the structural support.

Figure 30:
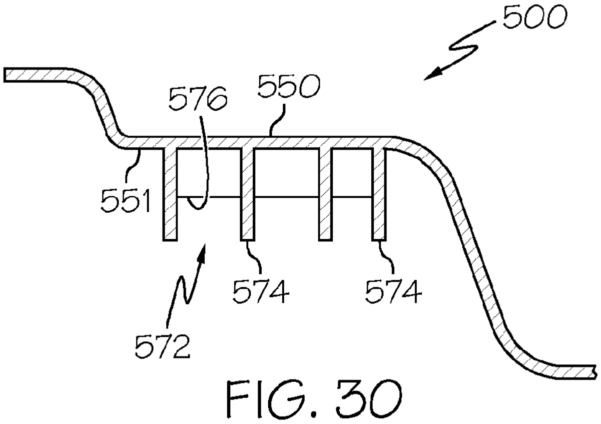
FIG. 30 is a cross-sectional view taken along the longitudinal axis of another embodiment of an overlay that includes integral structural support.

In some embodiments, the structural support may not necessarily be in communication with the bottom surface 548 of the bathtub 548. FIG. 30 shows a cross-sectional side view of the overlay 500 having an integral structural support 572. The structural support 572 comprises a plurality of ridges extending downward from the undersurface 551 of the sitting surface 550. The structural support 572 may comprise, for example, one or more ridges 574 that run cross-wise and one or more ridges 576 that run lengthwise to create a ridge grid. In some embodiments, the ridges may be in an "X" pattern, or other suitable pattern that provides additional structural rigidity to the sitting surface 550. The ridge grid may serve to reduce the flexing of the sitting surface 550 during use.

Figure 31:
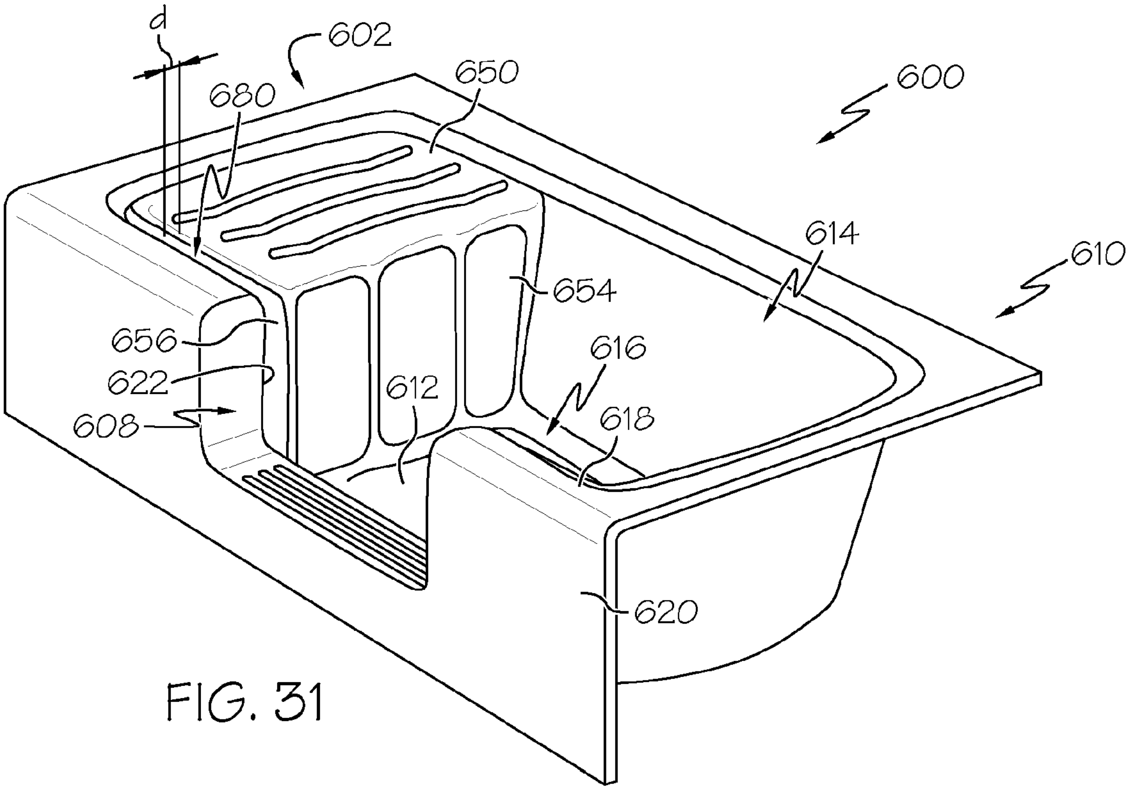
FIG. 31 is a perspective view of an overlay having an assistance feature.
Figure 32:
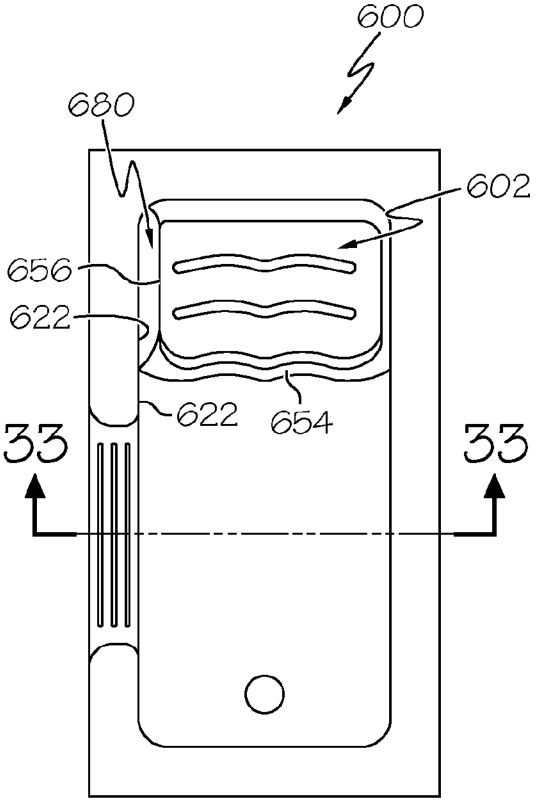
FIG. 32 is a top view of the overlay of FIG. 31.
Figure 33:
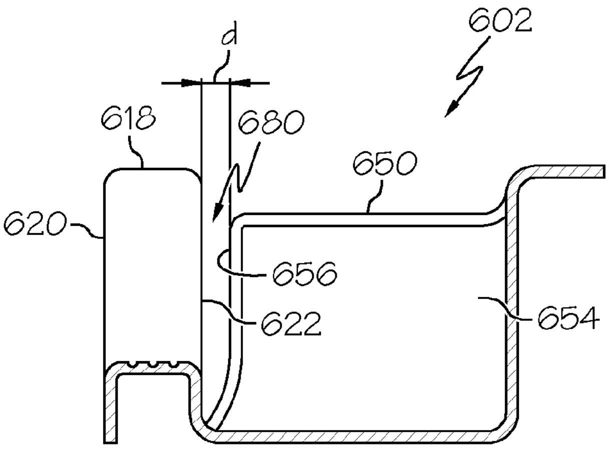
FIG. 33 is a cross-sectional view of the overlay of FIG. 32 taken along line 33-33.

FIG. 31 shows an overlay 600 having an assistance feature 602. FIG. 32 shows a top view of the overlay 600 and FIG. 33 shows a cross-sectional view of the overlay 600 taken along line 33-33. Referring now to FIGS. 31-33, the overlay 600 can be configured for placement over the bathtub 504 (FIG. 27), similar to the embodiments described above. The overlay 600 may comprise a body 610 that together with a bottom surface 612 defines a cavity or basin 614. A sidewall 616 can include a top wall 618, an outer wall 620, and an inner wall 622. The sidewall 616 of the overlay 600 can further define an opening 608 in the top wall 618, the outer wall 620, and the inner wall 622 that can facilitate ingress and egress from the bathtub 504.

The assistance feature 602 of the overlay 600 may be a molded seat having a sifting surface 650. Similar to the sitting surface 550 illustrated in FIG. 27, the sitting surface 650 may be contoured to accommodate a user. The assistance feature 602 may have a front vertical surface 654 and a side vertical surface 656. The side vertical surface 656 may be offset and generally parallel with a portion of the inner wall 622. The side vertical surface 656 may be separated or offset from the inner wall 622 by a distance "d." The separation between the vertical surface 656 and the inner wall 622 defines a pass-through 680 for a shower curtain (not shown). The distance “d” may be for example, in the range of 0.25" to 10" As is to be appreciated, however, the distance “d” may be any suitable distance. Relatively large overlays for use with oversized bathtubs may have a relatively large distance “d” (i.e., greater than 10"), whereas overlays for use with small bathtubs will likely utilize a smaller distance “d.” The distance “d” may also decrease in the distance traveling from the top of the molded seat to the bottom of the molded seat, such that the walls defining the pass-through 680 are downwardly tapering. In any event, the pass-through 680 may be configured to allow a shower curtain to be selectively placed between the assistance feature 602 and the inner wall 622 during use of the bathtub.

Figure 34:
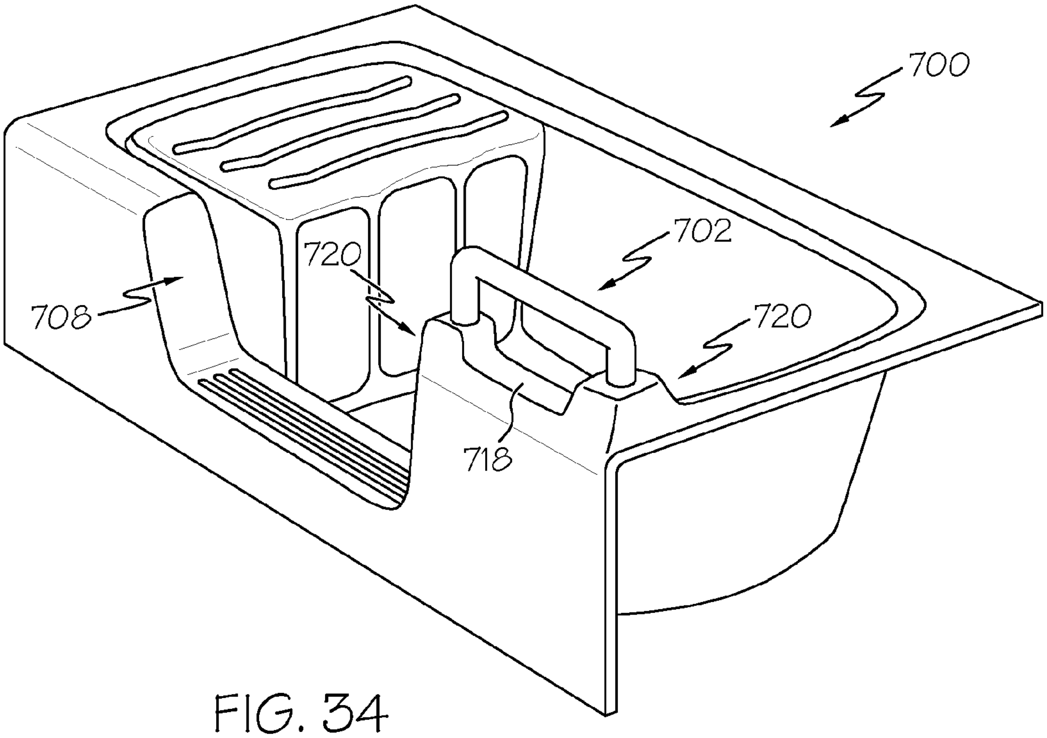
FIG. 34 is a perspective view of an overlay having an integrated grab bar.
Figure 35:
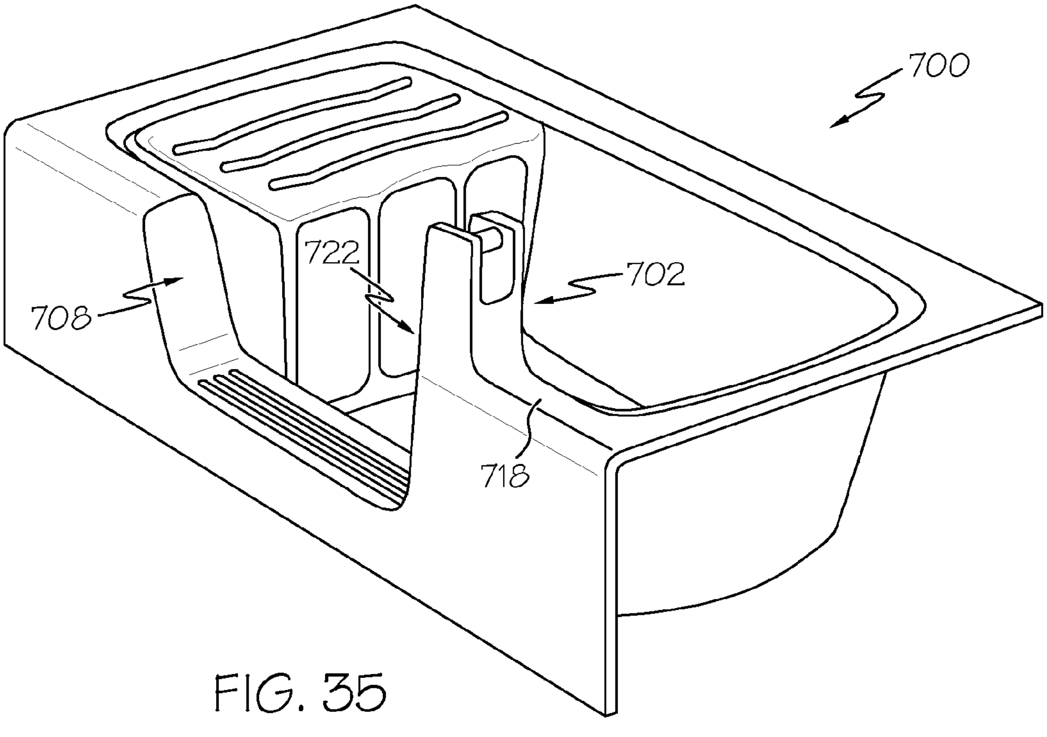
FIG. 35 is a perspective view of an overlay having an integrated grab bar.

In some embodiments, the overlay may incorporate assistance features that provide ingress and egress support, such as handrails, grab bars, and so forth. FIG. 34 and FIG. 35 illustrate an overlay 700 having an integrated grab bar 702. In both embodiments, the grab bar 702 is coupled to the top wall 718, although this disclosure is not so limited. In some embodiments, for example, a grab bar may be coupled to, or integrated with, a molded seat, an inner wall of the overlay, or one or more sides of the opening 708. In any event, the grab bar may be gripped by the user to provide stability. In some embodiments, the grab bar may be secured to the overlay 700. Referring to FIG. 34, the grab bar 702 is mounted to piers 720 molded into the overlay 700. The grab bar 702 may be any suitable material such as stainless steel or plastic, for example. The grab bar 702 illustrated in FIG. 35 is molded with the pier 722 such that the grab bar is integral with the overlay 700.

Figure 36:
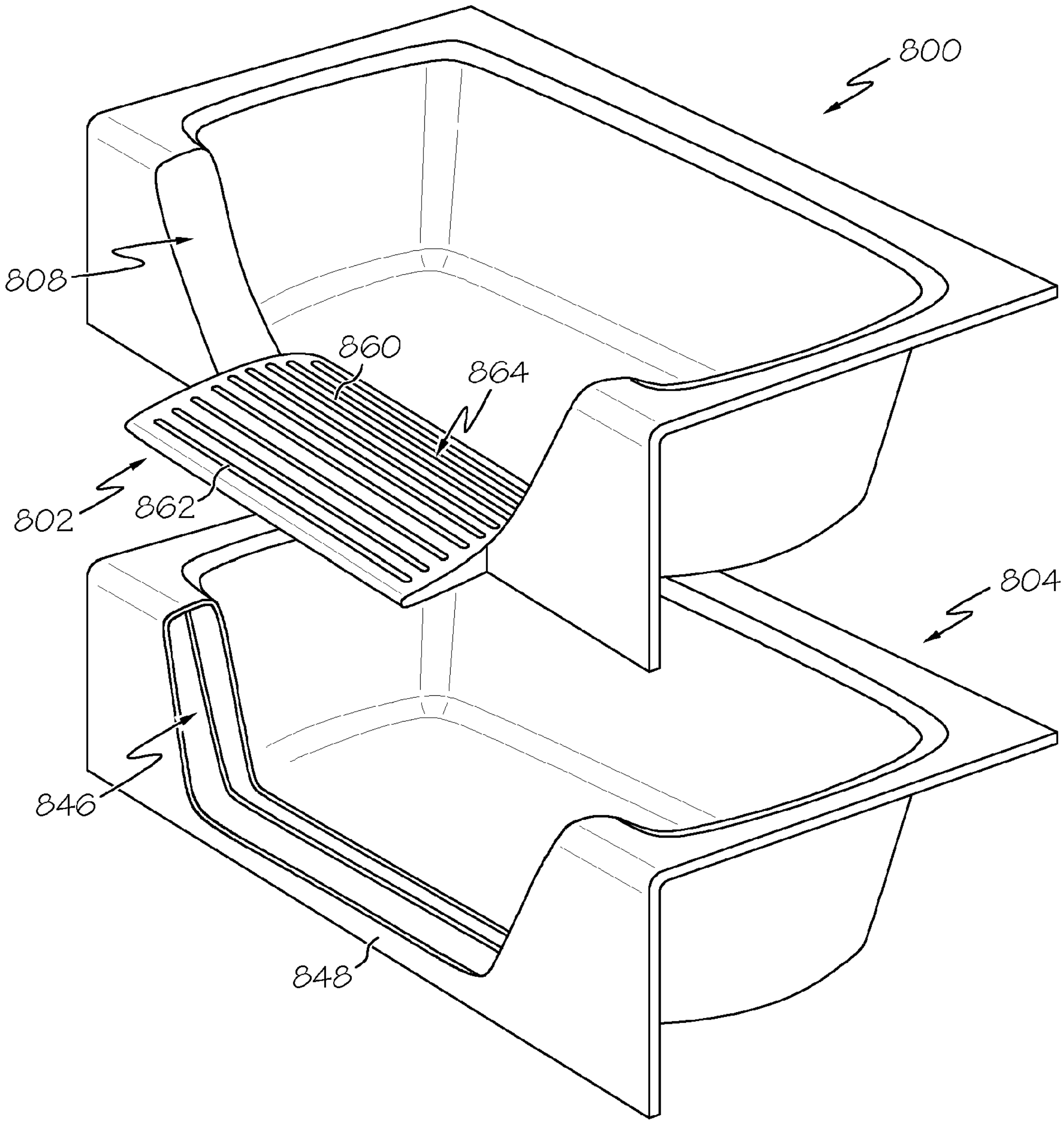
FIG. 36 is an exploded view of an overlay having an assistance feature and a bathtub.

FIG. 36 illustrates an overlay 800 having an assistance feature 802. As illustrated, the assistance feature 802 is a ramp 860 having an outer ramp portion 862 and an inner ramp portion 864. The ramp 860 is positioned within the opening 808 of the overlay 800. The ramp 860 may be molded into the overlay 800 or may be otherwise coupled to the overlay 800. The ramp 860 may have protrusions (i.e., textured) to provide traction during use. In various embodiments, the inclines of the outer and inner ramp portions 862, 864 may be substantially similar or they may be different. For example, the outer ramp portion 864 may have a gentler incline than the inner ramp portion 862. Furthermore, the length of the outer ramp portion 864 may be similar or different to the length of the inner ramp portion 862. Once the overlay 800 is installed over a bathtub 804, a user may roll a wheelchair over the ramp 860 or the user may use the opening 808 as a step-through.

As illustrated, the opening 846 is sized align with the overlay 800. The bathtub 804 has a threshold 848. The ramp 864 may be sized to allow ease of ingress and egress over the threshold 848. While the assistance feature 802 illustrated in FIG. 36 is a ramp, this disclosure is not so limited. In some embodiments, the assistance feature 802 may also comprise one or more steps. In some embodiments, the assistance feature 802 may comprise a combination of a ramp and one or more steps.

Figure 37:
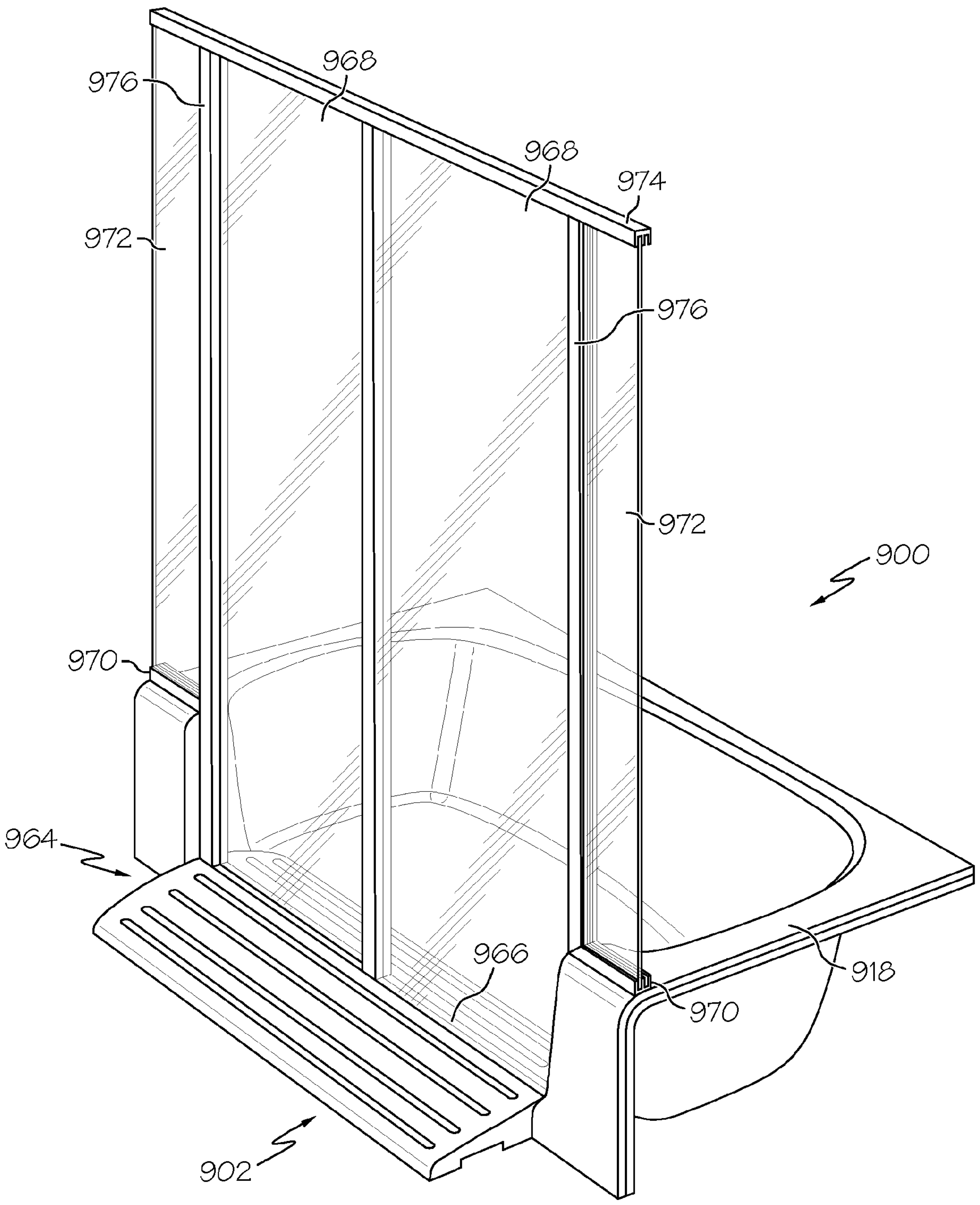
FIG. 37 is a perspective view of an overlay having an assistance feature.

FIG. 37 illustrates one embodiment of a tub liner, bathtub insert, or overlay 900 having an assistance feature 902 that can be used to cover all or a limited portion of the bathtub 804 (FIG. 36). The assistance feature 902 may be a ramp 964 that defines a laterally traversing track 966. The track 966 may be configured to receive one or more doors 968. The doors 968 may be sliding doors, as illustrated, although this disclosure is not so limited. For example, a hinged door may be used in some implementation, with the ramp providing a threshold for one or more hinged doors. In some embodiments, the track 966 may comprise an inner track and an outer track configured to receive a respective inner and outer sliding doors. The overlay 900 may also include one or more top wall tracks 970. Depending on the configuration of the bathtub 804, a plurality of top wall tracks 970 may be used. The top wall tracks 970 may be molded to the overlay 900 and configured to receive a sidelight 972. In some embodiments, the top wall tracks 970 may be coupled to the top wall 918 of the overlay 900. Additional framing may be utilized to secure the sliding doors and sidelights in place, such as top tracking 974 and side tracking 976. Although not illustrated, it is to be appreciated that the overlay 900 may also include additional assistance features such as, for example, a molded seat and grab bars. Furthermore, in some embodiments of overlay 900, the assistance feature is a step which incorporates the track 966.

Figure 38:
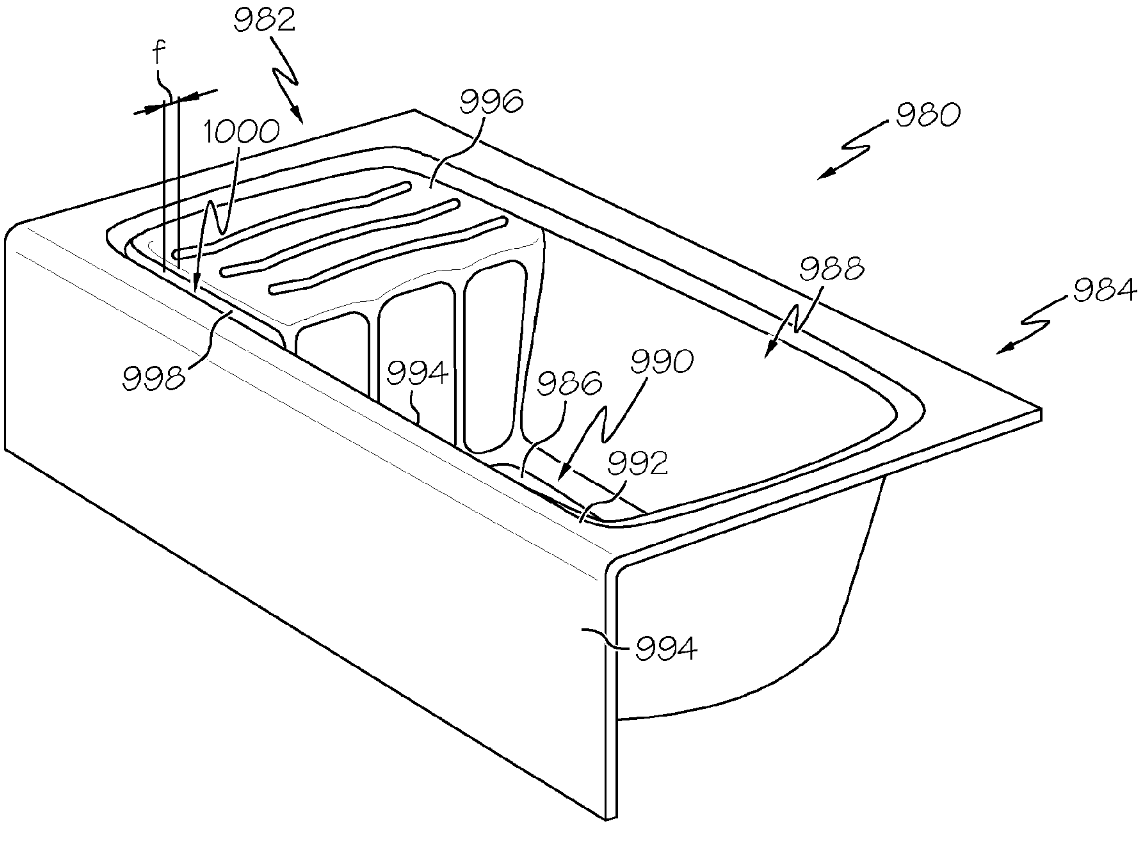
FIG. 38 is a perspective view of an overlay having an assistance feature.

FIG. 38 shows an overlay 980 having an assistance feature 982. Similar to embodiments described above, such as overlay 600 of FIG. 31, the overlay 980 can be configured for placement over a bathtub 504 (FIG. 27). The overlay 980 may comprise a body 984 that together with a bottom surface 986 defines a cavity or basin 988. A sidewall 990 can include a top wall 992, an outer wall 994, and an inner wall 994. The assistance feature 982 of the overlay 980 may be a molded seat having a sitting surface 996. Similar to the sitting surface 550 illustrated in FIG. 27, the sitting surface 996 may be contoured to accommodate a user.

The assistance feature 982 may have a side vertical surface 998. The side vertical surface 998 may be offset and generally parallel with a portion of the inner wall 994. The side vertical surface 998 may be separated or offset from the inner wall 994 by a distance “f” Similar to overlay 600 of FIG. 31, for example, the separation between the side vertical surface 998 and the inner wall 994 defines a pass-through 1000 for a shower curtain (not shown). The distance “d” may be for example, in the range of 0.25" to 10". As is to be appreciated, however, the distance “f” may be any suitable distance. Relatively large overlays for use with oversized bathtubs may have a relatively large distance “f” (i.e., greater than 10"), whereas overlays for use with small bathtubs will likely utilize a smaller distance “f” The distance “f” may also decrease in the distance traveling from the top of the molded seat to the bottom of the molded seat, such that the walls defining the pass-through 1000 are downwardly tapering. In any event, the pass-through 1000 may be configured to allow a shower curtain to be selectively placed between the assistance feature 982 and the inner wall 994 during use of the bathtub.

While the assistance feature of overlay 980 is shown as a seat, this disclosure is not so limited. Instead, additional, or alternative assistance features may be incorporated to, or molding unitary with, the overlay 980. For example, in various embodiments, the overlay 980 may comprise handrails, grab bars, and the like. The overlay 980 may also be configured to receive one or more sliding or hinged doors.

The embodiments presented in this disclosure are examples. Those skilled in the art can develop modifications and variants that do not depart from the spirit and scope of the bathtub door addition. Thus, the scope of the invention should be determined by appended claims and their legal equivalents, rather than by the examples given.

We claim:

1. A retrofit bathtub comprising:

(a) a bathtub body having a sidewall, the sidewall having a substantially U-shaped cutout;

(b) a substantially U-shaped step saddle, the substantially U-shaped step saddle being sized to fit the substantially U-shaped cutout, wherein the substantially U-shaped step saddle defines a channel, and wherein the substantially U-shaped step saddle has a maximum recess thickness;

(c) a door assembly, the door assembly comprising;

(i) at least one hinge coupled with the substantially U-shaped step saddle; and (ii) a door coupled with the at least one hinge such that the door is pivotable about the at least one hinge, wherein the door has a maximum door thickness, the maximum recess thickness being greater than the maximum door thickness; and (d) a seal.

2. The retrofit bathtub of claim 1, wherein the door comprises the seal.

3. The retrofit bathtub of claim 2, wherein the channel is sized to mate with the seal such that the retrofit bathtub is substantially watertight in a closed position.

4. The retrofit bathtub of claim 1, wherein the substantially U-shaped step saddle comprises the seal.

5. The retrofit bathtub of claim 1, further comprising at least one magnet positioned on the door.

6. The retrofit bathtub of claim 1, further comprising at least one magnet positioned on the substantially U-shaped step saddle.

7. The retrofit bathtub of claim 1, wherein the substantially U-shaped step saddle comprises a support structure coupled with a step plate.

8. The retrofit bathtub of claim 7, wherein the step plate includes integral support bracing that extends in a generally downward direction to support the step plate.

9. The retrofit bathtub of claim 7, wherein the step plate includes a tread.

10. The retrofit bathtub of claim 1, further comprising a strike plate coupled with the substantially U-shaped step saddle and at least one magnet coupled with the door, where the strike plate and the at least one magnet cooperate to retain the door in a closed position.

11. The retrofit bathtub of claim 1, wherein the door comprises a plurality of panels having an accordion configuration that is configured to extend across a width of the substantially U-shaped step saddle.

12. A retrofit bathtub comprising:

(a) a bathtub body having a sidewall, the sidewall having a substantially U-shaped cutout;

(b) a substantially U-shaped step saddle, the substantially U-shaped step saddle being sized to fit the substantially U-shaped cutout and having a maximum recess thickness;

(c) a door assembly, the door assembly comprising:

two doors, each comprising at least one hinge coupled with the substantially U-shaped step saddle; wherein each of the two doors is coupled with the respective at least one hinges such that each door is pivotable about the respective at least one hinges;

wherein the two doors are latchable together; and wherein each door has a maximum door thickness, the maximum recess thickness being greater than the respective maximum door thickness; and (d) a seal.

13. The retrofit bathtub of claim 12, wherein the substantially U-shaped step saddle comprises the seal.

14. The retrofit bathtub of claim 12, further comprising at least one magnet positioned on each of the two doors.

15. The retrofit bathtub of claim 12, further comprising at least one magnet positioned on the substantially U-shaped step saddle.

16. The retrofit bathtub of claim 12, wherein when the two doors are latched together, the two doors form a watertight seal.

17. A method for providing a door assembly for a bathtub to be retrofit, the method comprising:

providing the bathtub having a sidewall, the sidewall having a substantially U-shaped cutout removed from the bathtub;

providing a substantially U-shaped step saddle, the substantially U-shaped step saddle being sized to fit the substantially U-shaped cutout and having a maximum recess thickness; providing a door assembly; and wherein the substantially U-shaped saddle defines a channel, the door assembly comprising:

(i) at least one hinge coupled with the substantially U-shaped step saddle;

(ii) a door coupled with the at least one hinge such that the door is pivotable about the at least one hinge, wherein the door has a maximum door thickness, the maximum recess thickness being greater than the maximum door thickness;

positioning the substantially U-shaped step saddle in the substantially U-shaped cutout; and coupling the substantially U-shaped step saddle with the bathtub.

18. The method of claim 17, wherein coupling the substantially U-shaped step saddle with the bathtub fixedly couples the U-shaped step saddle and the bathtub.

19. The method of claim 17, wherein the door includes at least one magnet.

20. The method of claim 17, wherein the substantially U-shaped step saddle includes at least one magnet.

* * * * *